(12) United States Patent
Antony

(10) Patent No.: US 12,527,832 B2
(45) Date of Patent: Jan. 20, 2026

(54) **ENRICHED *Withania somnifera* BASED DIETARY COMPOSITION AND A METHOD THEREOF**

(71) Applicant: Arjuna Natural Private Limited, Alwaye (IN)

(72) Inventor: Benny Antony, Angamaly (IN)

(73) Assignee: ARJUNA NATURAL PRIVATE LIMITED, Alwaye (IN)

( * ) Notice: Subject to any disclaimer, the term of this patent is extended or adjusted under 35 U.S.C. 154(b) by 514 days.

(21) Appl. No.: 17/990,863

(22) Filed: Nov. 21, 2022

(65) Prior Publication Data

US 2023/0092904 A1 Mar. 23, 2023

Related U.S. Application Data

(60) Continuation-in-part of application No. 17/123,636, filed on Dec. 16, 2020, now Pat. No. 11,638,738, which is a continuation of application No. 15/326,450, filed as application No. PCT/IN2016/050354 on Oct. 18, 2016, now Pat. No. 10,251,927, application No. 17/990,863, filed on Nov. 21, 2022 is a continuation-in-part of application No. 15/958,654, filed on Apr. 20, 2018, now Pat. No. 10,166,266, which is a division of application No. 15/444,669, filed on Feb. 28, 2017, now Pat. No. 9,987,323, which is a continuation of application No. 15/326,450, filed as application No. PCT/IN2016/050354 on Oct. 18, 2016, now Pat. No. 10,251,927.

(30) Foreign Application Priority Data

Oct. 22, 2015 (IN) .......................... 5691/CHE/2015

(51) Int. Cl.

| | |
|---|---|
| *A61K 36/81* | (2006.01) |
| *A61K 9/14* | (2006.01) |
| *A61K 9/16* | (2006.01) |
| *A61K 9/20* | (2006.01) |
| *A61K 9/28* | (2006.01) |
| *A61K 9/50* | (2006.01) |
| *A61K 36/185* | (2006.01) |
| *A61K 36/21* | (2006.01) |
| *A61K 36/23* | (2006.01) |
| *A61K 36/47* | (2006.01) |
| *A61K 36/48* | (2006.01) |
| *A61K 36/53* | (2006.01) |
| *A61K 36/534* | (2006.01) |
| *A61K 36/54* | (2006.01) |
| *A61K 36/67* | (2006.01) |
| *A61K 36/71* | (2006.01) |
| *A61K 36/82* | (2006.01) |
| *A61K 36/87* | (2006.01) |
| *A61K 36/9066* | (2006.01) |
| *A61K 36/9068* | (2006.01) |

(52) U.S. Cl.
CPC ............... *A61K 36/81* (2013.01); *A61K 9/14* (2013.01); *A61K 9/16* (2013.01); *A61K 9/2081* (2013.01); *A61K 9/2846* (2013.01); *A61K 9/50* (2013.01); *A61K 9/5026* (2013.01); *A61K 9/5036* (2013.01); *A61K 9/5042* (2013.01); *A61K 36/185* (2013.01); *A61K 36/21* (2013.01); *A61K 36/23* (2013.01); *A61K 36/47* (2013.01); *A61K 36/48* (2013.01); *A61K 36/53* (2013.01); *A61K 36/534* (2013.01); *A61K 36/54* (2013.01); *A61K 36/67* (2013.01); *A61K 36/71* (2013.01); *A61K 36/82* (2013.01); *A61K 36/87* (2013.01); *A61K 36/9066* (2013.01); *A61K 36/9068* (2013.01); *A61K 2236/00* (2013.01); *A61K 2236/13* (2013.01); *A61K 2236/15* (2013.01); *A61K 2236/33* (2013.01); *A61K 2236/331* (2013.01); *A61K 2236/35* (2013.01); *A61K 2236/51* (2013.01)

(58) Field of Classification Search
None
See application file for complete search history.

(56) References Cited

U.S. PATENT DOCUMENTS

| | | |
|---|---|---|
| 2,540,979 A | 2/1951 | Clymer et al. |
| 6,153,198 A | 11/2000 | Ghosal |

(Continued)

FOREIGN PATENT DOCUMENTS

| | | |
|---|---|---|
| WO | WO 2005/034846 A3 | 4/2005 |
| WO | WO 2005/082392 A1 | 9/2005 |

(Continued)

OTHER PUBLICATIONS

Bhattacharyya, S, Pal, D, Banerjee, D, Majumder, UK and Ghosal, S, Comparative effect of withania somnifera and panax ginseng on swim-stress induced impaired energy status of mice, Pharmacologyonline 2:421-432(2009).

(Continued)

*Primary Examiner* — David J Blanchard
*Assistant Examiner* — Daniel F Coughlin
(74) *Attorney, Agent, or Firm* — Jyoti C. Iyer

(57) ABSTRACT

A unit dosage of an oral composition of an extract of *Withania somnifera* is disclosed. The extract of *Withania somnifera* includes total withanolides. The total withanolides includes withanolide glycosides and withanolide aglycones. The extract of *Withania somnifera* includes about 32% to about 38% by weight of the withanolide glycosides. Methods of preparing the extract of *Withania somnifera* are disclosed. Methods of treatment by administering the extract of *Withania somnifera* are disclosed.

8 Claims, 11 Drawing Sheets

(56) References Cited

U.S. PATENT DOCUMENTS

| | | | |
|---|---|---|---|
| 6,713,092 | B1 | 3/2004 | Ghosal |
| 7,108,870 | B2 | 9/2006 | Sangwan et al. |
| 7,318,938 | B2 | 1/2008 | Ghosal |
| 7,709,025 | B2 | 5/2010 | Fegely et al. |
| 8,206,757 | B2 | 6/2012 | McNeary |
| 8,501,186 | B2 | 8/2013 | Jadhav et al. |
| 8,597,697 | B2 | 12/2013 | McNeary |
| 8,636,985 | B2 | 1/2014 | Barron |
| 2007/0036873 | A1 | 2/2007 | Ghosal |
| 2011/0229591 | A1 | 9/2011 | Ravindranath et al. |
| 2012/0070521 | A1 | 3/2012 | Chitre et al. |
| 2014/0087009 | A1 | 3/2014 | McNeary |
| 2017/0157189 | A1 | 6/2017 | Antony |

FOREIGN PATENT DOCUMENTS

| | | | |
|---|---|---|---|
| WO | WO 2010/013254 A2 | 2/2010 | |
| WO | WO 10/068264 A2 | 6/2010 | |
| WO | WO 2012/160569 A1 | 11/2012 | |
| WO | WO 2015/115512 A1 | 8/2015 | |
| WO | WO 16/051424 A4 | 4/2016 | |

OTHER PUBLICATIONS

Chatterjee, S, Srivastava, S, Khalid, A, Singh, N, Sangwan, RS, Sidhu, OP, Roy, R, Khetrapal, CL, Tuli, R, Comprehensive metabolic fingerprinting of *Withania somnifera* leaf and root extracts, Phytochemistry 71:1085-1094 (2010).

Uddin, Q, Samiulla, L, Singh, VK and Jamil, SS, Phytochemical and Pharmacological Profile of Withania somnifera Dunal: A Review, Journal of Applied Pharmaceutical Science 02 (01):170-175(2012).

Rao, S, Teesta, VK, Bhattrai, A, Khushi, K and Bhat, S, In Vitro Propagation of Withania Somnifera and estimation of Withanolides for Neurological disorders, Journal of Pharmacognosy 3 (2):85-87(2012).

Sumithradevi, S, Pradeepa, D and Senthil, K, A simple method to purify Withanolide A from the roots of Withania Somnifera Dunal, International Journal of Pharma and Bio Sciences,2(2):231-236(2011).

Al-Hindawi, MK, Al-Deen, IH, Nabi, MH, Ismal, MA, Anti-inflammatory activity of some Iraqi plants using intact rats, Journal of Ethnopharmacology, 26:163-168(1989).

Davis, L, Kuttan, G, Suppressive effect of cyclophosphamide-induced toxicity by Withania somnifera extract in mice, Journal of Ethnopharmacology, 62:209-214(1998).

Dhuley, JN, Effect of Ashwagandha on lipid peroxidation in stress-induced animals, Journal of Ethnopharmacology, 60:173-178(1998).

Khare, CP, Indian Medicinal Plants—An Illustrated Dictionary, First Indian Reprint, Springer (India) Pvt. Ltd., New Delhi, 717-718(2007).

Patel, JB, Lahiri, SK, Shah, MB, Development of a New Method for Identification and Estimation of Withania somnifera Root, and a Method for Quantitative Analysis of Withaferin A in Young and Old Roots, Journal of planar Chromatography, 22:283-286(2009).

Sharma, V, Gupta, AP, Bhandari, P, Gupta, RC, Singh, B, A validated and Densitometric HPTLC method for the quantification of Withaferin-A and Withanolide-A in different plant parts of two Morphotypes of Withania somnifera, Chromatographia, 66(9):801-804(2007).

Singh, A, Saharan, VA, Garg, R, Gupta, VB, Effect of time on extraction of Ashwagandha in various Hydroalcoholic compositions and their Anti-inflammatory activity, International Journal of Green Pharmacy, 69-74(Jan.-Mar. 2011).

Guang-Li, W, Song-Quan, W, Qiao-Feng, W, Separation, purification and identification of acidic polysaccharide fraction extracted from Boletus edulis and its influence on mouse lymphocyte proliferation in vitro, Journal of Chemical and Pharmaceutical Research, 5(12):431-437 (2013).

Pawar, HA, D'Mello, PM, Spectrophotometric estimation of total polysaccharides in Cassia tora gum, Journal of Applied Pharmaceutical Science 01 (03); 93-95(2011).

Bhattacharyya, SK, Goel, RK, Kaur, R, Ghosal, S, Anti-Stress activity of Sitoindoside VII and VIII, New Acylsterylglucosides from Withania Somnifera, Phytotherapy Research, vol, No. 1(1987).

Wankhede, S, Saxena, M, Yadav, B, Determination of *Triterpenoid saponins* (Quillaja saponaria Molina) from Roots of *Withania somnifera* (L.) Dunal by High Performance Liquid Chromatography, Asian Journal of Chemistry, vol. 23, No. 2, 693-696 (2011).

Singh, SK, Valicherla, GR, Joshi, P, Shahi S, Syed, AA, Gupta, AP, Hossain, Z, Italiya, K, Makadia, V, Singh, SK, Wahajuddin, M, Gayen, JR, Determination of permeability, plasma protein binding, blood partitioning, pharmacokinetics and tissue distribution of Withanolide A in rats: A neuroprotective steroidal lactone, Drug Dev Res. 2018;1-13.

1. ASHWANOSIDE -15.328 (RETENTION TIME IN MINUTES)
2. WITHANOSIDE IV -15.601
3. WITHANOSIDE V+VI- 19.918
4. WITHAFERIN A-20.393
5. 12-DEOXYWITHASTRAMONOLIDE-21.395
6. WITHANOLIDE A-22.242
7. WITHANONE-22.488
8. WITHANOLIDE B-25.530

ENRICHED *Withania somnifera* BASED DIETARY COMPOSITION AND A METHOD THEREOF

This application is a continuation-in-part of U.S. application Ser. No. 17/123,636 filed Dec. 16, 2020, which is a continuation of U.S. application Ser. No. 15/326,450 filed Jan. 13, 2017, which is a 371 of International Application Ser. No. PCT/IN2016/050354 filed Oct. 18, 2016, which claims priority to Indian Provisional Appl. Ser. No. 5691/CHE/2015 filed Oct. 22, 2015, and is a continuation-in-part of U.S. application Ser. No. 15/958,654 filed Apr. 20, 2018, which is a divisional od U.S. application Ser. No. 15/444,669 filed Feb. 28, 2017, which is a continuation of U.S. application Ser. No. 15/326,450 filed Jan. 13, 2017, which is a 371 of International Application Ser. No. PCT/IN2016/050354 filed Oct. 18, 2016, which claims priority to Indian Provisional Appl. Ser. No. 5691/CHE/2015 filed Oct. 22, 2015, all of which are incorporated in entirety by reference.

FIELD OF THE INVENTION

The disclosure relates to a bioavailable composition derived from *Withania somnifera* and processes for manufacturing the same. The disclosure provides a method to enhance the bioavailability of withanolides obtained from plant extracts. The disclosure further relates to use of withanolides for improving immunity and sleep.

BACKGROUND OF THE INVENTION

Dried roots of *Withania somnifera* are known to be used in traditional medicine. *Withania somnifera* roots are extensively used in medicinal and clinical applications but other parts of the plant *Withania somnifera* are not been explored enough. Biological activity of components derived from roots of *Withania somnifera* have been studied extensively. The leaves of *Withania somnifera* contain steroidal lactones, which are commonly called withanolides. The withanolides have C28 steroidal nucleus with C9 side chain, having six membered lactone rings. Withaferin A is a steroidal lactone, it is the most important withanolide isolated from the extract of the leaves *Withania somnifera*. The leaves of the plant (Indian chemotype) are reported to contain 12 withanolides, 5 unidentified alkaloids, many free amino acids, chlorogenic acid, glycosides, glucose, condensed tannins, and flavonoids (Khare, 2007). The stem of the plant contains condensed tannins and flavonoids. The bark contains several free amino acids.

A study conducted by Singh et al. revealed that Withanolide A has poor bioavailability when administered orally, they found that the absolute bioavailability of withanolide A in plasma was poor, less than 5% (Singh S K, Valicherla G R, Joshi P. Shahi S, Syed A A, Gupta A P, Hossain Z. Italiya K, Makadia V. Singh S K, Wahajuddin M, Gayen J R. Determination of permeability, plasma protein binding, blood partitioning, pharmacokinetics and tissue distribution of Withanolide A in rats: A neuroprotective steroidal lactone. Drug Dev Res. 2018 November; 79(7):339-351. doi: 10.1002ddr.21463. Epub 2018 Oct. 4. PMID: 30284738.). Withanolide A may be impermeable under in vitro system, that is, in the MDCK cells or that it may be metabolized as it passes through the cell layer.

There are few patents that cover *Withania somnifera* extract, Ghosal et al, US patent publication 2004/0166184, discloses a composition of *Withania somnifera* with 8-25% Withanolide Glycosides and sitoindosides, about 25-75% Oligosaccharides and less than 2% of free Withaferin A (aglycone), the high level of oligosaccharides was the result of added saccharide during the aqueous-alcoholic solvent extraction process, and they are using non-polar solvent to remove withanolide A. Furthermore, Ghosal considers Withaferin A as a toxic compound this was again reiterated in Ghosal et al in US patent U.S. Pat. No. 6,153,198. In US patent U.S. Pat. No. 7,108,870B2, Sangwan et al, reported a process of isolating Withaferin A using a chromatographic process, for analytical and quantitative purpose. Patent publication WO2012160569, Jayesh Panalal et al discloses a twostep hot and cold polar solvent extraction process for extraction of Withanoside IV and V from *Withania somnifera* roots and its composition where the extract is blended with methyl ethyl ketone, diethyl ketone, and ethyl butyl ketone. The desired percentages of Withanoside IV and Withanoside V extracted from *Withania somnifera* roots are not less than (NLT) 0.8% and NLT 0.4% respectively. The purity of withanolide glycoside in extract disclosed has not been more than 10 or 20%, and nothing in the above cited documents is directed towards improving the bioavailability of active constituents of *Withania somnifera*.

So far, the research on *Withania somnifera* been limited to the compounds found in the roots. Since roots are used in traditional medicine in India and other parts of the world, yet sufficient attention to actives present in leaves has not been given. No study has been conducted on how the efficacy of certain compounds changes when the overall composition of the extract is reconfigured, and to explore the medicinal properties of Withaferin A. There is also a need to extract out only the beneficial compounds which are mapped to specific diseases and incorporate them into composition to be used for treatment purpose.

SUMMARY OF THE INVENTION

This disclosure focuses on actives from leaves and roots of *Withania somnifera*, compositions made using the extract of roots and leaves of *Withania somnifera*, processes to extract them efficiently, and methods of treatment using the disclosed extracts.

Disclosure provides methods of enriching withanolide glycosides in *Withania somnifera* extract and preparing a composition made from said extract. Disclosure provides methods to increase the bioavailability of withanolides when administered orally to a human or animal. Disclosure provides methods of using extracts of *Withania somnifera* enriched with withanolide glycosides for improving immunity, sleep, stamina and reducing inflammation.

A unit dosage of an oral composition of an extract of *Withania somnifera* is disclosed. The extract of *Withania somnifera* includes total withanolides. The total withanolides includes withanolide glycosides and withanolide aglycones. The extract of *Withania somnifera* includes includes about 32% to about 38% by weight of the withanolide glycosides. A dosage form of the unit dosage of the oral composition of the extract of *Withania somnifera* is a capsule, tablet, powder, granule, soft gel capsule, suspension, dispersion, elixir, paste, gel, liquid, dragees, or combinations thereof. A dosage of the extract of *Withania somnifera* in the unit dosage of the oral composition of the extract of *Withania somnifera* ranges from about 1 mg to about 1000 mg of the extract of *Withania somnifera*.

A unit dosage of the oral composition of the extract of *Withania somnifera* having an additive is disclosed. The additive is a nutrient, magnesium stearate, stearic acid, rice flour, cellulose, silicon dioxide, sugar, hydroxypropyl methylcellulose, glycerine, gelatine, propylene glycol, polyethylene glycol, pectin, sodium citrate, beeswax, purified water, vegetable oil, injectable organic esters or combinations thereof. The nutrient is an amino acid, a carbohydrate, a vitamin, folic acid, omega-3 fatty acid, a mineral, a herbal extract, lutein, zeaxanthin, an antioxidants or combination thereof.

A unit dosage of the oral composition of the extract of *Withania somnifera* having about 35% by weight of the withanolide glycosides is disclosed.

A unit dosage of the oral composition of the extract of *Withania somnifera* wherein the withanolide glycosides include withanoside IV, and wherein the withanolide aglycones comprises withanolide A and withaferin A is disclosed.

A unit dosage of the oral composition of the extract of *Withania somnifera* a ratio of withanoside IV:withaferin A ranging from about 1:3 w/w to about 3:1 w/w is disclosed.

A unit dosage of the oral composition of the extract of *Withania somnifera* having at least about 2% withanoside IV by weight, and about 2% withaferin A by weight is disclosed.

Disclosed teachings provide a unit dosage of the oral composition of the extract of *Withania somnifera* prepared from the root and leaf of *Withania somnifera* plant.

A unit dosage of the oral composition of the extract of *Withania somnifera* has a dosage ranging from about 24 mg to about 480 mg of the extract of *Withania somnifera*.

An effective dose of the of the extract of *Withania somnifera* ranges from about 0.4 mg to about 8 mg of the extract of *Withania somnifera* per kg body weight of a mammal.

A method of treatment by administering a dosage of the extract of *Withania somnifera* is disclosed. The dosage ranges from about 60 mg to about 240 mg. The dosage is administered to a mammal once a day. Methods of treatment by administering the dosage twice a day to a mammal are also disclosed. The mammal can be a human.

A method of enhancing bioavailability of the total withanolides in a subject is disclosed. The method includes administering the unit dosage of the oral composition of the extract of *Withania somnifera* to the subject in need thereof.

A method of enhancing bioavailability of the total withanolides is disclosed wherein the bioavailability of the total withanolides is about 10-fold to about 30-fold greater when administering the unit dosage of the oral composition of the disclosed extract of *Withania somnifera* having 35±3 withanolide glycoside as compared to administering a standard alcoholic extract of *Withania somnifera* extract. Standard alcoholic extract is an extract of *Withania somnifera* prepared with ethanol or methanol and has about 5.5% withanolide glycosides and about 8.8% total withanolides.

A method to increase the oral bioavailability of the withaferin A is disclosed. The method includes administering a unit dosage of the oral composition of the extract of *Withania somnifera* to a subject in need thereof.

A method to increase the oral bioavailability of withanoside IV by administering a unit dosage of an oral composition of the extract of *Withania somnifera* to a subject in need thereof is disclosed.

A method of non-therapeutically improving immune system of a mammal by administering a unit dosage of an oral composition of the extract of *Withania somnifera* to the mammal in need thereof is disclosed. The method of treatment improves a parameter of the immune system such as immunoglobulins, cytokines. T-cells, B-cells or natural killer (NK)-cells.

A method of treatment by administering a oral composition of the extract of *Withania somnifera* to a mammal in need thereof is disclosed. The method of treatment in the mammal includes increasing gene expression of Gamma amino butyric acid, increasing histamine receptor gene expression, decreasing onset time of sleep, increasing duration of sleep, increasing delta band during sleep, lowering stress or decreasing inflammation.

A method of increasing swimming endurance in a mammal by administering a unit dosage of an oral composition of an extract of *Withania somnifera* to the mammal in need thereof is disclosed.

An extract of *Withania somnifera* having total withanolides is disclosed. The total withanolides includes withanolide glycosides and withanolide aglycones. The extract of *Withania somnifera* having about 32% to about 38% by weight of the withanolide glycosides is disclosed.

A method of preparing an extract of *Withania somnifera* is disclosed. The method includes treating dried root and leaves of *Withania somnifera* with a hydro-alcoholic solvent to obtain a residue and a supernatant, wherein the hydro-alcoholic solvent is ethanol, methanol, propanol, butanol, tert-butyl alcohol, benzyl alcohol, isopropyl alcohol, or combinations thereof. Next, the supernatant is adsorbed on to a synthetic adsorbent having a pore size ranging from about 90 to about 1000 angstroms to obtain a loaded adsorbent, wherein the synthetic adsorbent is alumina, silica gel, carbon, polystyrene, divinylbenzene matrix, organic adsorbents, polymeric adsorbents, or combinations thereof. Next, the loaded adsorbent is leached with a hydro-alcoholic solvent and the hydro-alcoholic solvent elute is collected, wherein the hydro-alcoholic solvent is ethanol, methanol, propanol, butanol, tert-butyl alcohol, benzyl alcohol, isopropyl alcohol, or combinations thereof. The hydro-alcoholic solvent elute is dried to obtain a powder of the extract of *Withania somnifera* having about 32% to about 38% of withanolide glycosides by weight.

A method of preparing an extract of *Withania somnifera* is disclosed. The method includes charging dried root and leaves of *Withania somnifera* into a reactor having a hydro-alcoholic solvent and performing a solvent extraction for sixty minutes at boiling temperature to obtain a first supernatant and a first residue and separating the first supernatant from the first residue. Next, performing a solvent extraction of the first residue to obtain a second supernatant and a second residue and separating the second supernatant from the second residue. Next step is performing a solvent extraction of the second residue to obtain a third supernatant and a third residue and separating the third supernatant and the third residue.

Then combining and concentrating the first supernatant, the second supernatant and the third supernatant to obtain a concentrated supernatant, followed by adsorbing the concentrated supernatant on to a synthetic adsorbent having a pore size ranging from about 90 to about 1000 angstroms, then leaching with a hydro-alcoholic solvent and collecting a hydro-alcoholic solvent elute, and drying the hydro-alcoholic solvent elute to obtain a powder of the extract of *Withania somnifera* having about 32% to about 38% of withanolide glycosides by weight. The hydro-alcoholic solvent is ethanol, methanol, propanol, butanol, tert-butyl alcohol, benzyl alcohol, isopropyl alcohol, or combinations thereof. The synthetic adsorbent is alumina, silica gel, carbon, polystyrene, divinylbenzene matrix, organic adsorbents, polymeric adsorbents, or combinations thereof.

A composition having at least 20% withanolides is disclosed. The withanolides are Withanoside IX, Withanoside X, physagulin D (1→6)-β-D-glucopyranosyl-(1→4)-β-D-glucopyranoside), Sitoindoside IX, 27-O-glucopyranosyl Withaferin A, Cilistol V-6'-O-glucoside, Withanoside-IV), Withanoside-V/VI, or a combination thereof.

A cilistol V-6'-O-glucoside compound is disclosed.

A composition having a compound of the following formula:

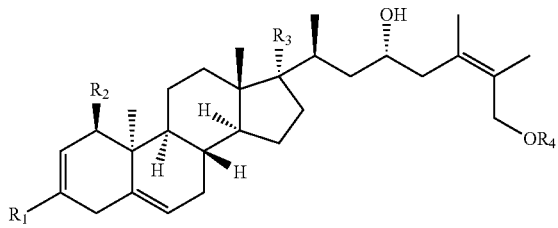

wherein $R_1$ is OH, H, or O.
$R_2$ is OH, H, or O,
$R_3$ is OH or H, and
$R_4$ is $C_6H_{10}O_4$—O—$C_6H_{11}O_5$ is disclosed.

The composition wherein the compound is derived from extraction of *Withania somnifera* is disclosed.

A composition having the formula:

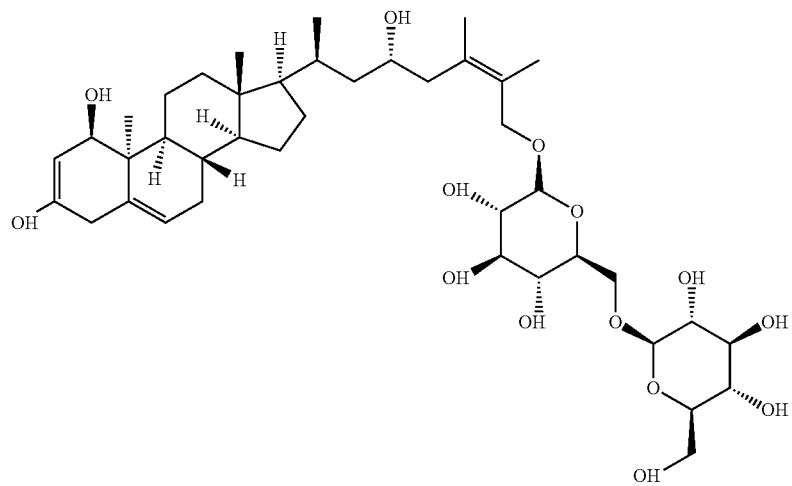

is disclosed. The compound is cilistol V-6'-O-glucoside. The compound is also named as ashwanoside by the inventor. Ashwanoside has been discovered in disclosed extracts prepared from *Withania somnifera*.

BRIEF DESCRIPTION OF THE DRAWINGS

Various features and advantages of the present invention should become apparent from the following figures of the accompanying drawings, which demonstrate the process steps involved in various process trials carried under certain preferred embodiment under the invention as well as the findings.

DETAILED DESCRIPTION OF THE INVENTION

Figure 1:
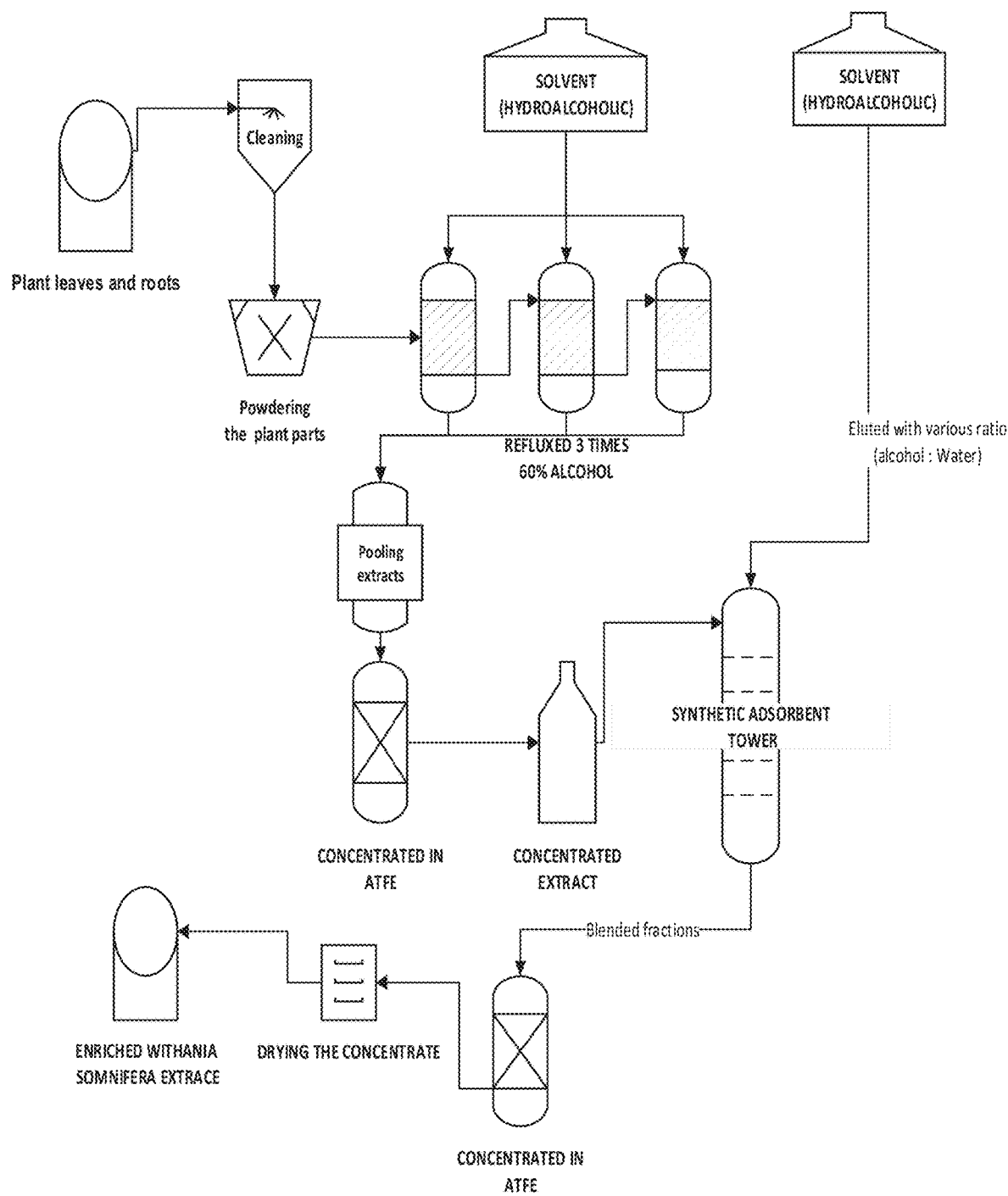
FIG. 1 is a flow chart showing the method of extracting *Withania somnifera* plant parts with hydroalcoholic solvent to obtain a hydro alcoholic extract of *Withania somnifera*, and further enriching *Withania somnifera* extract by solid-liquid extraction to obtain a purified extract enriched with withanolide glycosides.

The invention is directed towards an extract composition obtained from Ashwagandha for improving immunomodulatory activity, anti-inflammatory activity, antistress activity, antidiabetic activity, endurance and sleep quality consisting of Withanolide glycoside in the range of about 32% to about 38%.

In the following detailed description, the invention is described through numerous illustrations, and embodiments. The embodiments and illustrations are to be understood in its broadest sense. For a person skilled in the art the invention is not limited to the embodiments set forth and that the invention may very well be practiced without some of the specific details and examples discussed. The illustrations provide the best mode for the invention which can be well understood by a person skilled in the art and do not intend to narrow the scope of any subject matter claimed.

The following detailed description discloses four aspects of the invention, first, it discloses a composition with high purity of Withanolide Glycosides and Withaferin A. Second it discloses a method to increase bioavailability of Withanolides. Third, it discloses a process of extracting high purity of Withanolide Glycosides from *Withania somnifera* plant parts and fourth, a method of improving the immune system, sleep quality using an *Withania somnifera* extract.

The word "*Withania somnifera*" and "Ashwagandha" mean the same thing and may be used interchangeably throughout the specification. The term "*Withania*" referred to plants from the group but not limited to Acnistus, Datura, Deprea, Dunalis, Iochroma, Jaborosa, Lycium, Nicandra, Physalis, Salpichroa, Tubocapsicum, Discopodium, Trechonaetes, *Withania*, Witheringia, and any plant from the genus *Withania* or a plant that contains Withanolides.

The term "nutrients" referred henceforth includes amino acids, carbohydrates, vitamins, folic acid, omega-3 fatty acids, minerals, plant extracts, lutein, zeaxanthin and antioxidants.

As used herein, the terms "effective amount" and "effective dose" refer to an amount that is sufficient to achieve the desired therapeutic result or to have an effect on undesired symptoms but is generally insufficient to cause adverse side effects. The effective amount and the therapeutic effect of it will be different for different subjects based on their age, weight and other health condition.

As used herein, the term "subject" refers to the target of administration, it can be a vertebrate, such as a mammal, a fish, a bird, a reptile, or an amphibian. Alternatively, the subject of the herein disclosed methods can be a human, non-human primate, horse, pig, rabbit, dog, sheep, goat, cow, cat, guinea pig or rodent. The term does not denote a particular age or sex. Thus, adult and new-born subjects, whether male or female, are intended to be covered unless otherwise specified.

"Glycowithanolides" means "Withanolide glycosides" in this document and may be used interchangeably. Withanoside IV, stated in several places in this specification is a Withanolide glycoside. Withaferin A stated in several places in this specification is a Withanolide aglycone. "Total Withanolides" or Withnolids means Withanolide glycosides and Withanolide aglycones combined.

A Withanolide Glycosides composition is disclosed, wherein the Withanolide Glycosides is derived from *Withania* plant parts. The purity of Withanolide Glycosides in the composition is more than 20%, more specifically in the ranges of about 32% to about 38% w/w. The high purity of Withanolide Glycosides in the extract enables the extract to be used at lower dosage. In example 8, bioavailability study using different *Withania somnifera* extracts, all subjects were given single dose of drug standardised to contain 185 mg total withanolides. Among the four groups, Ashwagandha extracts with 35% withanolide glycoside was given at a lower dose of 480 mg and all other three extract with lower Withanolides/withanolide glycoside were given at high dose in order to standardize the dosage of 185 mg total withanolides. The plant parts as referred here means the root, leaves, stem, flower, fruit, seed, or combination thereof. Root and leaves of *Withania somnifera* plant are used predominantly. Said composition is water-soluble, making it easy to be used in liquid formulations and beverages.

In an embodiment, a *Withania somnifera* extract enriched with 20 to 50% w/w of Withanolide Glycosides is disclosed. Alternatively, *Withania somnifera* extract enriched with withanolide glycosides in about 20% to about 30% w/w or about 25% to about 30% w/w or about 30% to about 35% w/w or about 30% to about 40% w/w, about 35% to about 50% w/w or 33±3% w/w, or about 35±3% w/w, about 32% to about 38% w/w is disclosed. Said composition is water-soluble.

In an embodiment, a dietary composition is disclosed with a *Withania somnifera* extract enriched with 20 to 50% w/w of Withanolide Glycosides and one or more additive, wherein the extract makes about 1 to 99% w/w of the composition. In another embodiment, a dietary composition is disclosed with a *Withania somnifera* extract enriched with 20 to 30% w/w of Withanolide Glycosides, and one or more additive, wherein the extract makes about 1 to 99% w/w of the composition. In yet another embodiment, a dietary composition is disclosed with a *Withania somnifera* extract enriched with 25 to 30% w/w of Withanolide Glycosides, and one or more additive, wherein the extract makes about 1 to 99% w/w of the composition. In yet another embodiment, a dietary composition is disclosed with a *Withania somnifera* extract enriched with 30 to 35% w/w of Withanolide Glycosides, and one or more additives, wherein the extract makes about 1 to 99% w/w of the composition. In yet another embodiment, a dietary composition is disclosed with a *Withania somnifera* extract enriched with 30 to 40% w/w of Withanolide Glycosides and one or more additives, wherein the extract makes about 1 to 99% w/w of the composition. In yet another embodiment, a dietary composition is disclosed with a *Withania somnifera* extract enriched with 35±3% w/w of Withanolide Glycosides, and one or more additives, wherein the extract makes about 1 to 99% w/w of the composition. In yet another embodiment, a dietary composition is disclosed with a *Withania somnifera* extract enriched with 32% to 38% w/w of Withanolide Glycosides, and one or more additives, wherein the extract makes about 1 to 99% w/w of the composition. In yet another embodiment, a dietary composition is disclosed with a *Withania somnifera* extract enriched with 35 to 50% of Withanolide Glycosides, and one or more additives, wherein the extract makes about 1 to 99% of the composition. The additive as stated above is an acceptable carrier that refers to aqueous or nonaqueous solutions, dispersions, suspensions, or emulsions, as well as powders for reconstitution into sterile injectable solutions or dispersions just prior to use. Additives enable the composition to be formulated as tablets, pills, dragees, capsules, liquids, gels, syrups, slurries, suspensions, and the like, for oral administration. The additives are selected from but not limited to a group of nutrients, magnesium stearate, stearic acid, rice flour, cellulose, silicon dioxide, sugar, hydroxypropyl methylcellulose, glycerine, gelatine, propylene glycol, polyethylene glycol, pectin, sodium citrate, beeswax, purified water, vegetable oil, injectable organic esters, and combination thereof. For example: A 500 mg capsule consist of 1 to 499 mg *Withania somnifera* extract, 1 to 499 mg additive, and 20 to 50% Withanolide Glycosides in said *Withania somnifera* extract.

A unit dosage of an oral composition of an extract of *Withania somnifera* is disclosed. The extract of *Withania somnifera* includes total withanolides. The total withanolides includes withanolide glycosides and withanolide aglycones. The extract of *Withania somnifera* includes includes about 32% to about 38% by weight of the withanolide glycosides. A dosage form of the unit dosage of the oral composition of the extract of *Withania somnifera* is a capsule, tablet, powder, granule, soft gel capsule, suspension, dispersion, elixir, paste, gel, liquid, dragees, or combinations thereof. A dosage of the extract of *Withania somnifera* in the unit dosage of the oral composition of the extract of *Withania somnifera* ranges from about 1 mg to about 1000 mg of the extract of *Withania somnifera*.

A unit dosage of the oral composition of the extract of *Withania somnifera* having an additive is disclosed. The additive is a nutrient, magnesium stearate, stearic acid, rice flour, cellulose, silicon dioxide, sugar, hydroxypropyl methylcellulose, glycerine, gelatine, propylene glycol, polyethylene glycol, pectin, sodium citrate, beeswax, purified water, vegetable oil, injectable organic esters or combinations thereof. The nutrient is an amino acid, a carbohydrate, a vitamin, folic acid, omega-3 fatty acid, a mineral, a herbal extract, lutein, zeaxanthin, an antioxidants or combination thereof.

A unit dosage of the oral composition of the extract of *Withania somnifera* having about 35% by weight of the withanolide glycosides is disclosed.

A unit dosage of the oral composition of the extract of *Withania somnifera* wherein the withanolide glycosides include withanoside IV, and wherein the withanolide aglycones comprises withanolide A and withaferin A is disclosed.

A unit dosage of the oral composition of the extract of *Withania somnifera* a ratio of withanoside IV:withaferin A ranging from about 1:3 w/w to about 3:1 w/w is disclosed.

A unit dosage of the oral composition of the extract of *Withania somnifera* having at least about 2% withanoside IV by weight, and about 2% withaferin A by weight is disclosed.

Disclosed teachings provide a unit dosage of the oral composition of the extract of *Withania somnifera* prepared from the root and leaf of *Withania somnifera* plant.

A unit dosage of the oral composition of the extract of *Withania somnifera* has a dosage ranging from about 24 mg to about 480 mg of the extract of *Withania somnifera*.

An effective dose of the of the extract of *Withania somnifera* ranges from about 0.4 mg to about 8 mg of the extract of *Withania somnifera* per kg body weight of a mammal.

A *Withania somnifera* extract for use in accordance with the present disclosure thus may be formulated using one or more pharmacologically active nutrients which may provide auxiliary support or possess similar activity and which can be formed into a composition that can be used as dietary supplements. The dietary composition with a *Withania somnifera* extract and one or more nutrients further includes an additive. In an embodiment, a dietary composition is disclosed with a *Withania somnifera* extract enriched with 20 to 50% w/w of Withanolide Glycosides and one or more nutrients, and the extract makes about 1 to 99% w/w of the composition. In another embodiment, a dietary composition is disclosed with a *Withania somnifera* extract enriched with 20 to 30% w/w of Withanolide Glycosides and one or more nutrients, and the extract makes about 1 to 99% w/w of the composition. In yet another embodiment, a dietary composition is disclosed with a *Withania somnifera* extract enriched with 25 to 30% w/w of Withanolide Glycosides and one or more nutrients, and the extract makes about 1 to 99% w/w of the composition. In yet another embodiment, a dietary composition is disclosed with a *Withania somnifera* extract enriched with 30 to 35% w/w of Withanolide Glycosides and one or more nutrients, and the extract makes about 1 to 99% w/w of the composition. In yet another embodiment, a dietary composition is disclosed with a *Withania somnifera* extract enriched with 30 to 40% w/w of Withanolide Glycosides and one or more nutrients, and the extract makes about 1 to 99% w/w of the composition. In yet another embodiment, a dietary composition is disclosed with a *Withania somnifera* extract enriched with 35±3% w/w of Withanolide Glycosides and one or more nutrients, and the extract makes about 1 to 99% w/w of the composition. In yet another embodiment, a dietary composition is disclosed with a *Withania somnifera* extract enriched with 32% to 38% w/w of Withanolide Glycosides and one or more nutrients, and the extract makes about 1 to 99% w/w of the composition. In yet another embodiment, a dietary composition is disclosed with a *Withania somnifera* extract enriched with 35 to 50% of Withanolide Glycosides and one or more nutrients, and the extract makes about 1 to 99% of the composition. The term "nutrients" includes amino acids, carbohydrates, vitamins, folic acid, omega-3 fatty acids, minerals, herbal extracts, lutein, zeaxanthin and antioxidants. For example; A 500 mg capsule comprising 1 to 499 mg *Withania somnifera* extract, 1 to 499 mg one or more nutrients, and 20 to 50% Withanolide Glycosides in said *Withania somnifera* extract. The dietary composition with a *Withania somnifera* extract and one or more nutrients further includes an additive, where the additive is an acceptable carrier well known in the art.

In another embodiment, a dietary composition is disclosed with Withanosides and Withaferin A in 1:10 to 10:1 w/w ratio. In yet another embodiment, a dietary composition is disclosed with Withanosides and Withaferin A in 1:1 to 2:1 w/w ratio. In yet another embodiment, a dietary composition is disclosed with Withanosides and Withaferin A in 1:1 to 1:2 w/w ratio. More specifically Withanoside IV and Withaferin A in 1:10 to 10:1 w/w ratio; Withanoside IV and Withaferin A in 1:1 to 2:1 w/w ratio; and Withanoside IV and Withaferin A in 1:1 to 1:2 w/w ratio. In one embodiment, the ratio of Withanoside IV:Withaferin A ranges from 1:3 w/w to 3:1 w/w. The combination of Withanosides and Withaferin A for use in accordance with the present disclosure thus may be formulated in conventional manner using one or more physiologically acceptable carriers comprising excipients/additives and auxiliaries which facilitate processing of the compositions and compounds into preparations which can be used as dietary supplements. The additives are selected from a group of but not limited to gum resin, polymer, starch, fiber, nutrients, magnesium stearate, stearic acid, rice flour, cellulose, silicon dioxide, sugar, hydroxypropyl methylcellulose, glycerine, gelatine, propylene glycol, polyethylene glycol, pectin, sodium citrate, beeswax, purified water, vegetable oil, injectable organic esters and combination thereof. Further, the withanolides are derived from *Withania somnifera* plant parts. The composition is administered along with other nutrients selected from the group of but not limited to vitamins, amino acids, folic acid, omega-3 fatty acids, zinc, copper, lutein, zeaxanthin, gum resin, polymer, starch and, fibre. Further includes an excipient, where the excipient is an acceptable carrier well known in the art. Such carriers enable the compounds of the disclosure to be formulated as tablets, pills, dragees, capsules, liquids, gels, syrups, slurries, suspensions and the like, for oral administration. The excipients are selected from but not limited to a group of nutrients, magnesium stearate, stearic acid, rice flour, cellulose, silicon dioxide, sugar, hydroxypropyl methylcellulose, glycerine, gelatine, propylene glycol, polyethylene glycol, pectin, sodium citrate, beeswax, purified water, vegetable oil, injectable organic esters and combination thereof.

In an embodiment a 100-1000 mg dietary composition is disclosed with about 7 mg to about 350 mg Withanolide Glycosides, 0.5 to 10 mg Withanoside IV and 0.5 to 10 mg Withaferin A. Further includes an additive, where the additive is an acceptable carrier well known in the art, the additives are selected from but not limited to a group of nutrients, magnesium stearate, stearic acid, rice flour, cellulose, silicon dioxide, sugar, hydroxypropyl methylcellulose, glycerine, gelatine, propylene glycol, polyethylene glycol, pectin, sodium citrate, beeswax, purified water, vegetable oil, injectable organic esters, and combination thereof. The formulation is moulded in to dosage forms such as tablets, pills, dragées, capsules, liquids, gels, syrups, slurries, suspensions and the like, for oral administration. Further the Withanolide Glycosides is derived from *Withania somnifera* plant parts. Precisely a *Withania somnifera* plant parts extract with a purity of at least 25% Withanolide Glycosides, at least 2% Withanoside IV and 2% Withaferin A. More specifically *Withania somnifera* plant parts extract with a purity of 35±3% Withanolide Glycosides, at least 5±3% Withanoside IV and 5±3% Withaferin A. The effective dosage of the extract of *Withania somnifera* ranging from about 24 mg to about 480 mg of the extract of *Withania somnifera* or 0.4 to 8 mg of the extract of *Withania somnifera* per Kg body weight of a mammal.

In example 10, the lowest dose of *Withania somnifera* extract with 35% withanolide glycoside given to mice for sleep study was 5 mg/Kg. The equivalent dose in a human is 0.4 mg/Kg bodyweight of human or 24 mg for an average 60 Kg human.

Calculation

To calculate human equivalent dose, divide dose given to mice by 12.3. That is, 5/12.3=0.4 mg/Kg.

If it is a 60 Kg human, dose is 0.4*60=24 mg/60 Kg human.

In example 8, bioavailability study in human subjects, the dose of *Withania somnifera* extract with 35% withanolide glycoside given to human subjects were 480 mg. Which is equivalent to 8 mg/Kg bodyweight of human.

In yet another embodiment, a composition derived from *Withania somnifera* has a HPLC profile comprising at least the following peaks having respective retention times at about 0.78 (Withanoside IX), 1.0(0 Withanoside X), 0.86 (physagulin D (1→6)-β-D-glucopyranosyl-(1→4)-β-D-glucopyranoside), 1.04 (Sitoindoside IX (27-O-glucopyranosyl Withaferin A)), 0.97 (Cilistol V-6'-O-glucoside, (Ashwanoside,)), 1.0 (Withanoside-IV), and 1.26 (Withanoside-V/VI) minutes.

Figure 11A:
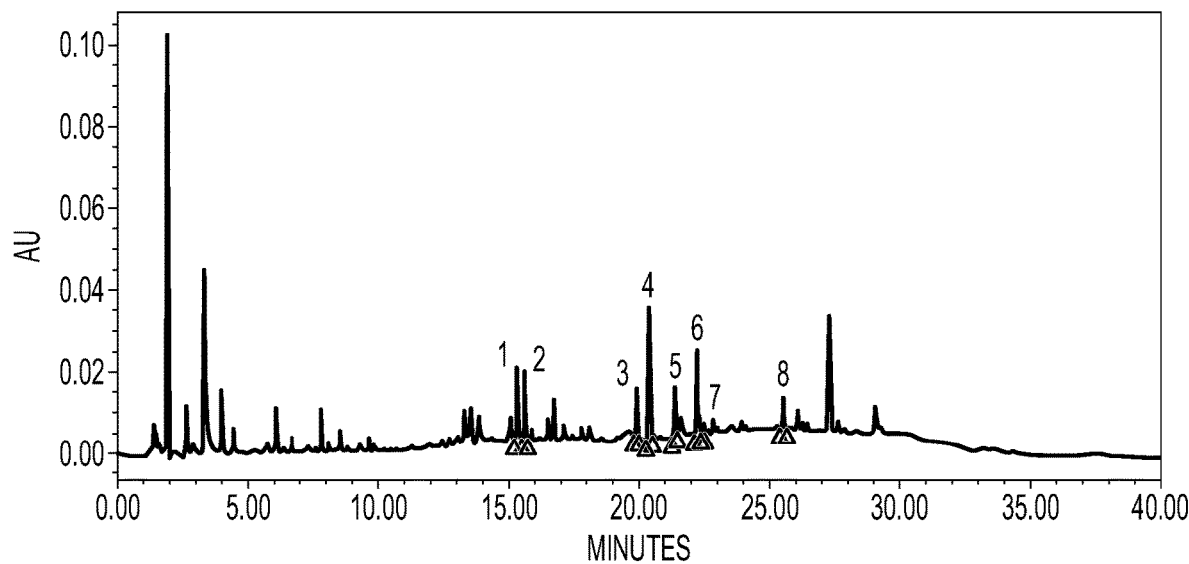
FIG. 11A is a high performance liquid chromatography (HPLC) profile of standard alcoholic extract control sample 1 from Example 1 showing retention times of the following compounds: 1) Ashwanoside (at 15.33 mins retention time); 2) Withanoside IV—15.601; 3) Withanoside V+VI (19.918); 4) Withaferin A—20.393; 5) 12-Deoxywithastrmonolide—21.395; 6) Withanolide A—22.242; 7) Withanone—22.488; and 8) Withanolide B—25.530.
Figure 11B:
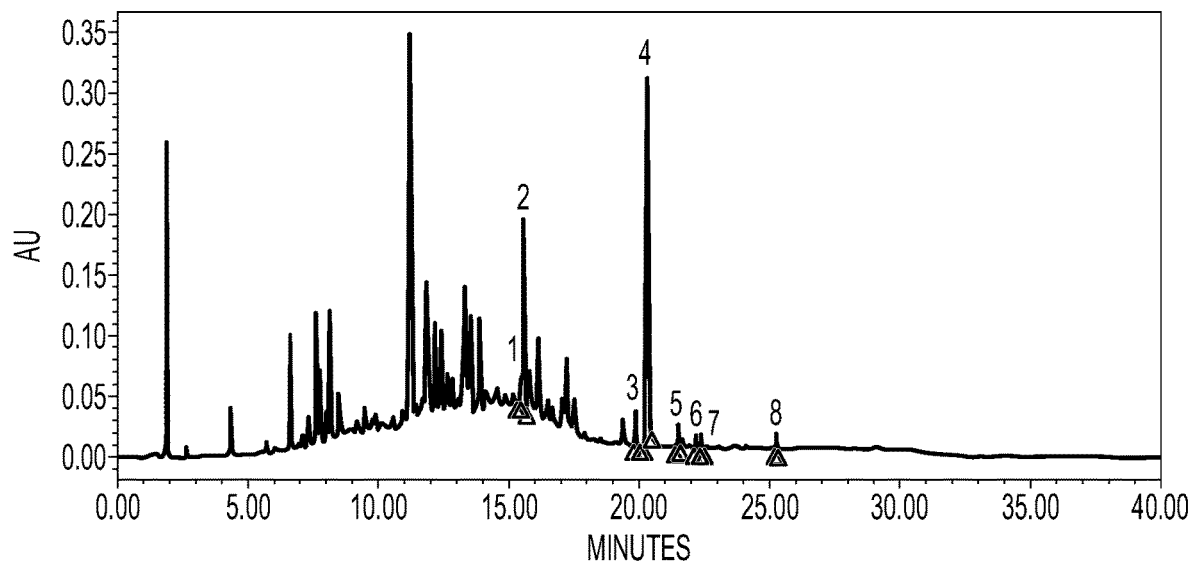
FIG. 11B is a high performance liquid chromatography (HPLC) profile of sample 3 from Example 3. (WG35, wherein WG is an abbreviation for withanolide glycosides) showing retention times of the following compounds: 1) Ashwanoside (at 15.33 mins retention time); 2) Withanoside IV—15.601; 3) Withanoside V+VI (19.918); 4) Withaferin A—20.393; 5) 12-Deoxywithastrmonolide—21.395; 6) Withanolide A—22.242; 7) Withanone—22.488; and 8) Withanolide B—25.530.

FIG. 11 A and FIG. 11B showing retention times of the following compounds: 1) Ashwanoside (at 15.33 mins retention time); 2) Withanoside IV—15.601; 3) Withanoside V+VI (19.918); 4) Withaferin A—20.393; 5) 12-Deoxywithastrmonolide—21.395; 6) Withanolide A—22.242; 7) Withanone—22.488; and 8) Withanolide B—25.530. FIG. 11A shows data for control standard alcoholic extract sample 1. FIG. JI B shows data for sample 3 from Example 3. As seen in the HPLC profile, height or intensity of peak 2 (Withanoside IV) and 4 (Withaferin A) is higher in sample prepared as per Example 4 compared to standard alcoholic extract from Example 1.

Figure 12:
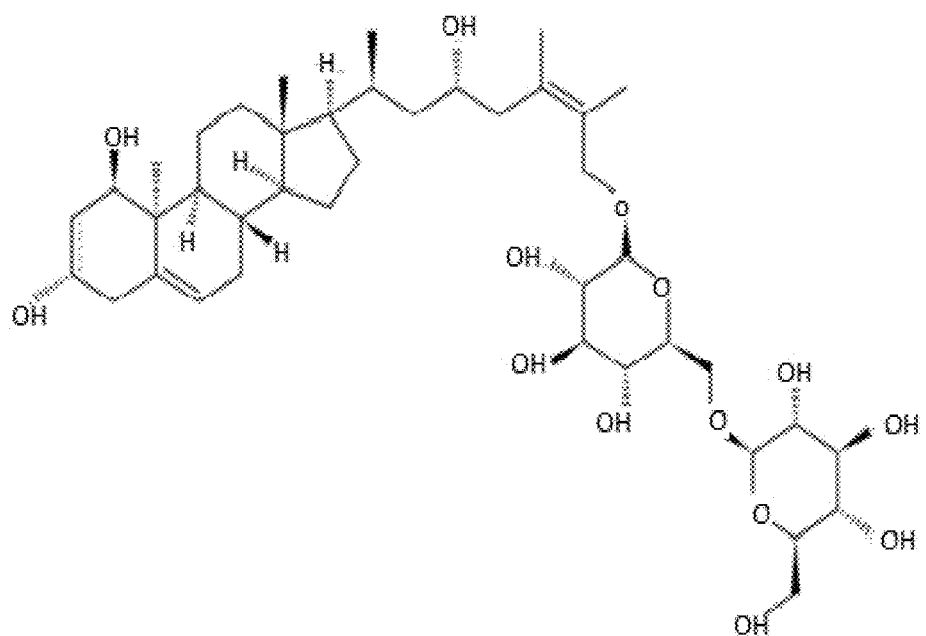
FIG. 12 provides the structure of Ashwanoside compound found in the *Withania somnifera* extract.

Ashwanoside is the name the inventor has given to a Cilistol V-6'-O-glucoside as shown in FIG. 12.

A composition comprising at least 20% withanolides, wherein the withanolides are selected from a group consisting of Withanoside IX, Withanoside X, physagulin D (1→6)-β-D-glucopyranosyl-(1→4)-β-D-glucopyranoside), Sitoindoside IX, 27-O-glucopyranosyl Withaferin A, Cilistol V-6'-O-glucoside, Withanoside-IV), Withanoside-V/VI, and a combination thereof. Some embodiments of the extract of *Withania somnifera* include cilistol V-6'-O-glucoside.

Some embodiments of the extract of *Withania somnifera* provide a composition having a compound having the following formula:

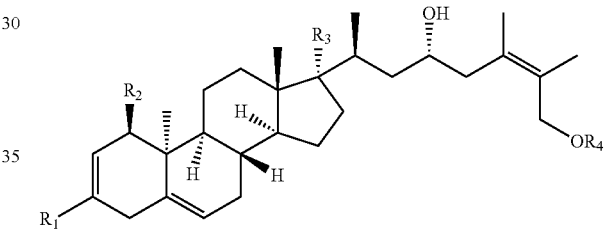

wherein $R_1$ is OH, H, or O.
$R_2$ is OH, H, or O.
$R_3$ is OH or H, and
$R_4$ is ($C_6H_{10}O_4$—O—$C_6H_{11}O_5$).

Some embodiments provide a composition of the extract of *Withania somnifera* which includes a compound of the following formula:

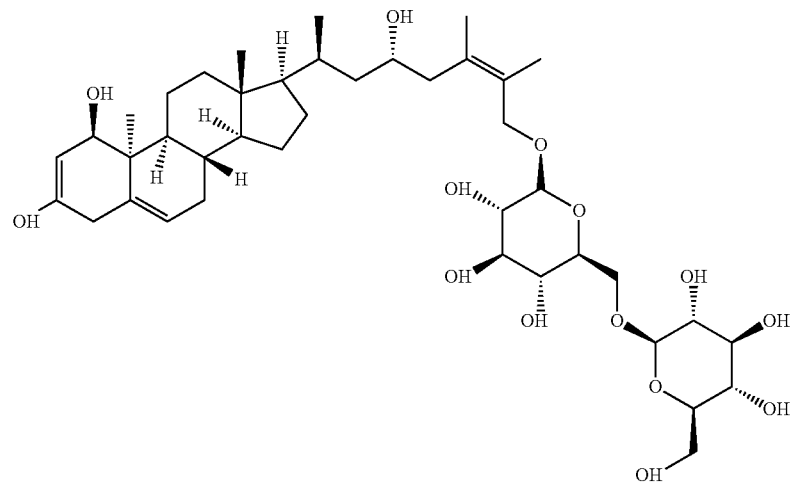

wherein the compound (also referred to as Ashwanoside) is derived from extraction of *Withania somnifera*.

Another aspect disclosed is extraction processes to produce a high purity *Withania somnifera* extract enriched in withanolide glycosides. An extract of *Withania somnifera* is disclosed, wherein the extract of *Withania somnifera* includes total withanolides. The total withanolides includes withanolide glycosides and withanolide aglycones. The extract of *Withania somnifera* includes about 32% to about 38% by weight of the withanolide glycosides.

FIG. 1 provides a method of extraction of *Withania somnifera* plant parts (roots and leaves) used as raw material. The plant parts are cleaned and dried. After drying, the plant parts are powdered. The powder plant parts are extracted with hydro-alcoholic solvent. The powder is refluxed with solvent at the boiling temperature of the solvent for one hour to obtain a second residue and second supernatant. The second residue is then further extracted two more times with three times the quantity of solvent at each extraction. All the supernatants are separated from the residue and pooled together. The pooled extract is concentrated (in Agitated thin film evaporator) to obtain concentrated extract. The concentrated extract is absorbed on to a synthetic adsorbent by passing the concentrated extract through a tower packed with synthetic adsorbents, and the synthetic adsorbents have pore size in the range of 45 to 900 Angstrom. More preferably pore radius is about 45 to 200 Angstrom. The synthetic adsorbent is eluted with hydro-alcoholic solvents of different ratio. Resulting fractions are blended and concentrated. The Concentrated fraction was fed into a vacuum stripper and dried under vacuum to obtain powder of extract of *Withania somnifera*.

A method of preparing an extract of *Withania somnifera* is disclosed. The method includes:
a) treating dried root and leaves of *Withania somnifera* with a hydro-alcoholic solvent to obtain a residue and a supernatant:
b) adsorbing the supernatant from step a) on to a synthetic adsorbent having a pore size ranging from about 90 to about 1000 angstroms to obtain a loaded adsorbent;
c) leaching the loaded adsorbent of step b) with a hydro-alcoholic solvent and collecting a hydro-alcoholic solvent elute; and
d) drying the hydro-alcoholic solvent elute of step c) to obtain a powder of the extract of *Withania somnifera*,
wherein the hydro-alcoholic solvent of step a) is selected from the group consisting of ethanol, methanol, propanol, butanol, tert-butyl alcohol, benzyl alcohol, isopropyl alcohol, and combinations thereof;
wherein the hydro-alcoholic solvent of step c) is selected from the group consisting of ethanol, methanol, propanol, butanol, tert-butyl alcohol, benzyl alcohol, isopropyl alcohol, and combinations thereof;
wherein the synthetic adsorbent is selected from the group consisting of alumina, silica gel, carbon, polystyrene, divinylbenzene matrix, organic adsorbents, polymeric adsorbents, and combinations thereof: and,
wherein the extract of *Withania somnifera* comprises about 32% to about 38% of withanolide glycosides by weight.

A method of preparing an extract of *Withania somnifera* is disclosed. The method includes:
a) charging dried root and leaves of *Withania somnifera* into a reactor having a hydro-alcoholic solvent and performing a solvent extraction for sixty minutes at boiling temperature to obtain a first supernatant and a first residue and separating the first supernatant from the first residue;
b) performing a solvent extraction of the first residue from step a) to obtain a second supernatant and a second residue and separating the second supernatant from the second residue,
c) performing a solvent extraction of the second residue from step b) to obtain a third supernatant and a third residue and separating the third supernatant and the third residue;
d) combining and concentrating the first supernatant, the second supernatant and the third supernatant to obtain a concentrated supernatant;
e) adsorbing the concentrated supernatant from step d) on to a synthetic adsorbent having a pore size ranging from about 90 to about 1000 angstroms;
f) leaching the product of step e) with a hydro-alcoholic solvent and collecting a hydro-alcoholic solvent elute, and
g) drying the hydro-alcoholic solvent elute of step f) to obtain a powder of the extract of *Withania somnifera*,
wherein the hydro-alcoholic solvent of step a) is selected from the group consisting of ethanol, methanol, propanol, butanol, tert-butyl alcohol, benzyl alcohol, isopropyl alcohol, and combinations thereof,
wherein the hydro-alcoholic solvent of step f) is selected from the group consisting of ethanol, methanol, propanol, butanol, tert-butyl alcohol, benzyl alcohol, isopropyl alcohol, and combinations thereof;
wherein the synthetic adsorbent is selected from the group consisting of alumina, silica gel, carbon, polystyrene, divinylbenzene matrix, organic adsorbents, polymeric adsorbents, and combinations thereof; and,
wherein the extract of *Withania somnifera* comprises about 32% to about 38% of withanolide glycosides by weight.

In yet another embodiment, a method to enrich Withanolides in *Withania somnifera* extract is disclosed. The method involves mixing a regular extract of *Withania somnifera* with a synthetic adsorbent to form a socked adsorbent, in case the extract is in powder form, the extract can be dissolved in water or a hydro-alcoholic solvent, then filter, and pass the solution through the adsorbents. The soaked absorbent is leached with a Hydro-alcoholic solvent, and the hydro-alcoholic solvent is concentrated to get enriched *Withania somnifera* extract. By the end of enrichment process a *Withania somnifera* extract with 30 to 40% Withanolide Glycosides obtained. The adsorbent used is a synthetic adsorbent with a pore radius ranging from 45 to 900 Angstrom. More preferably pore radius is about 45 to 200 Angstrom. Natural adsorbents could be used if they have uniform pore radius. The synthetic adsorbent is selected from a group of Alumina, Silica gel, carbon, polystyrene, divinylbenzene matrix, organic adsorbents, and polymeric adsorbents. *Withania somnifera* extract can be absorbed onto adsorbents by dissolving the extract in a solvent or using a concentrate from the solvent extraction process of *Withania somnifera* plant parts.

In one embodiment, there is an adsorption bed, the bed is packed with synthetic adsorbent with uniform pore radius and is packed in a tower or column. A *Withania somnifera* extract is absorbed by the absorbents. Then the bed is leached with hydro-alcoholic solvent to leach out the enriched extract rich in Withanolide Glycosides. In some cases, the bed might be leached first with deionized water. The adsorbent used is a synthetic adsorbent with a pore radius ranging from 45 to 900 Angstrom. More preferably pore radius is about 45 to 200 Angstrom. The process improves yield of the final product, making the process economical.

*Withania somnifera* extraction is a two-step extraction process, in the first step, plant parts of *Withania* are extracted with hydro-alcoholic solvent to obtain an extract. In the second step, the extract is subjected to a solid-liquid extraction using a hydro-alcoholic solvent to obtain a purified *Withania* extract. The pure *Withania* extract is rich in Withanolide Glycosides, purity can range from about 32% to about 38% by weight of the extract. In some embodiments, the Withanolide Glycosides purity is standardised at about 33±3% by weight.

In one embodiment, in the first step of extraction as stated above, water:alcohol solution of 1:1 to 2:3 v/v is used as the hydro-alcoholic solvent. In an alternative embodiment, water:alcohol solution of 2:3 v/v is used as hydro-alcoholic solvent. The alcoholic solvent is selected from a group of Ethanol, Methanol, Isopropyl, propanol, butanol, Tert-Butyl alcohol, Benzyl alcohol, Isopropyl alcohol, or a combination thereof. Furthermore, in the second step of extraction, water to alcohol solution of 3:7 to 1:9 v/v is used, it is called the hydro-alcoholic eluting liquid or just eluting liquid. In an alternative embodiment water to alcohol at 3:7 v/v is used as the eluting liquid. In one embodiment ethanol is used as the alcoholic solvent/eluting liquid in both the steps. Alternatively, methanol can be used in place of ethanol as a solvent in both the steps.

In yet another embodiment of the extraction process, in the first step the dried plant parts (namely roots and leaves) of *Withania* plant are extracted multiple times with 2 to 10 times with a new batch of solvent. After extracting the plant parts with a solvent, a supernatant and residue is obtained, the supernatant is separated from the residue and the residue is further extracted with a fresh batch of solvent. The extraction step is repeated multiple times and supernatant obtained from each step is pooled, concentrated, to obtain a concentrate *Withania* extract. The hydro-alcoholic solvent with water to alcohol ratio of about 1:1 to 2:3 v/v is used as the solvent, or at a water to alcohol ratio of about 2:3 v/v ratio. In an alternative embodiment, in the first step plant parts of *Withania* plants are charged into a reactor and the plant parts are extracted with a hydro-alcoholic solvent. After extraction a supernatant and a residue are formed, the supernatant is separated from the residue and the residue is extracted again. The plant parts are extracted multiple times with a new batch of solvent. The supernatants from all the extraction steps are pooled except for the last extraction step and pooled supernatant are concentrated. The supernatant from the last extraction is recycled back (whole or in part) to the first extraction. Recycling of supernatant is done to improve the purity.

In an alternative embodiment of the extraction process, the second step involves extracting the concentrated extract obtained from the first step with a hydro-alcoholic solvent in the presence of an adsorbent. More precisely extract from the first step is adsorbed onto the adsorbent and solvent is passed through the adsorbent to leach out a pure *Withania* extract. The adsorbent used is a synthetic adsorbent with a pore radius ranging from 45 to 900 Angstrom.

More preferably pore radius is about 45 to 200 Angstrom. The synthetic adsorbent is selected from a group of Alumina, Silica gel, carbon, polystyrene, divinylbenzene matrix, organic adsorbents, and polymeric adsorbents. Preferably the adsorbents are of the same pore radius and are packed in a bed or tower. In the second step a 3:7 v/v ratio is used for the hydro-alcoholic eluting liquid, three-part water and seven-part alcohol. The eluting liquid is selected from a group of water, Ethanol, Methanol, Isopropyl, propanol, butanol. Tert-Butyl alcohol, Benzyl alcohol, Isopropyl alcohol, or a combination thereof. In one embodiment, the hydro-alcoholic eluting liquid is Ethanol.

Another aspect relates to the immunomodulatory property of the said Withanolide glycosides composition. Henceforth, disclosed is the method to improve immune system by administering an effective dose of Withanolide glycosides to a person in need. More specifically withanolides are capable of modulating immunoglobulins (Ig's), cytokines and TBNK cells (T cells, B cells & NK cells) levels in our body. Withanolide Glycosides at an effective dosage act as an adaptogen, improving the immune system of humans and animals. Administering an effective dose of Withanolide Glycosides to a person results in stabilization of physiological processes and promotion of homeostasis. An effective dose for WG35 composition for immunomodulation would be about 60 to 180 mg per day or twice a day. Human study was conducted to establish the effect of Withanolide Glycosides and efficacy of WG35 on immunoglobulins (Ig's), cytokines and TBNK cells (T cells, B cells & NK cells). For the study, subjects were randomized to receive a daily dose of either one 180 mg capsule comprising 60 mg WG35 composition with at least 21 mg withanolides glycosides (about 0.2 to 0.5 mg/kg body weight) as the test group, for a period of 60 days or a matching placebo containing roasted rice powder for 30 days. Overall increase in IgG and IgM was detected in test group compared to the placebo group. An increase of 2-fold in IgG was seen in test group over placebo group for the first 30 days. By the end of $60^{th}$ day there was a 11% increase in IgG and 9% increase in IgM.

Figure 2A:
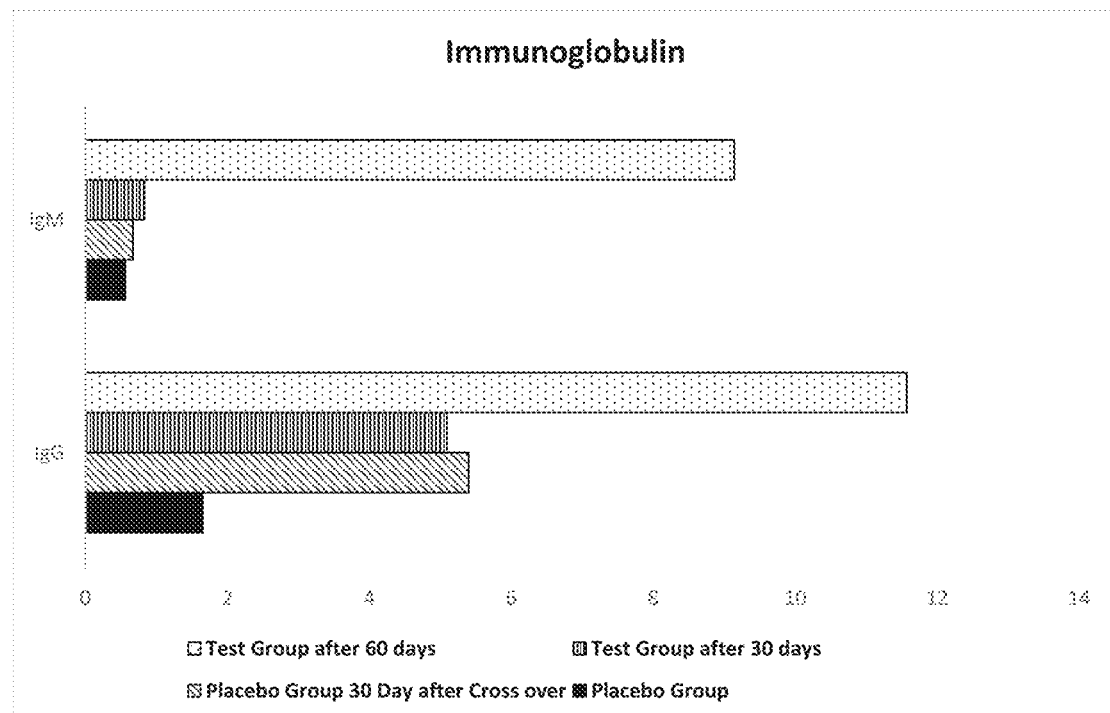
FIG. 2A provides a bar graph showing percentage change in immunoglobulins IgM and IgG in the extract, placebo and the placebo cross over.
Figure 2B:
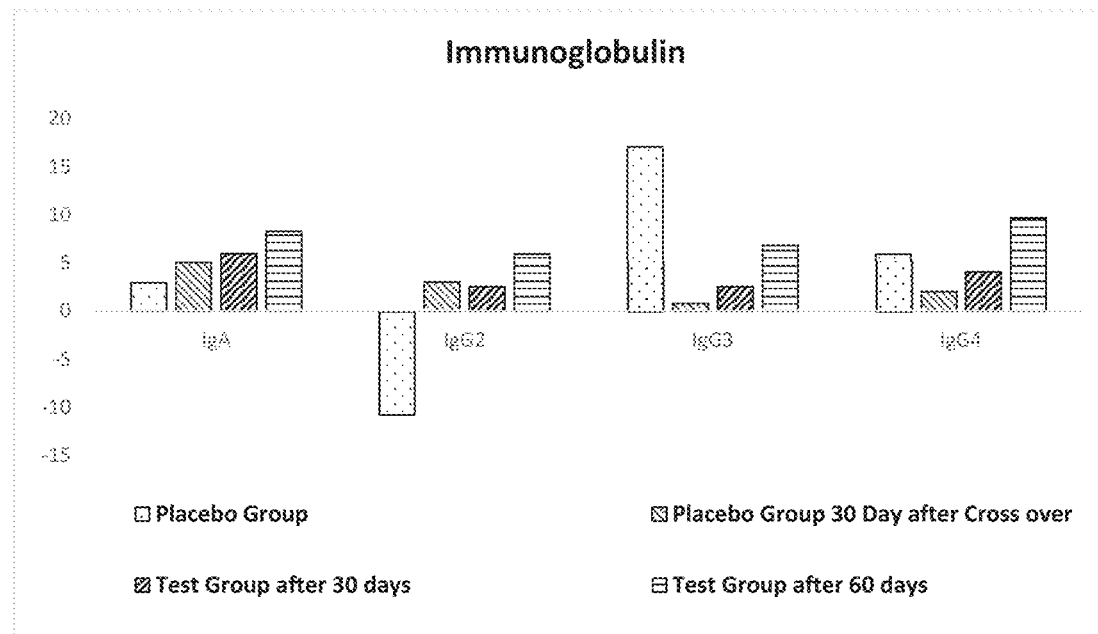
FIG. 2B provides a bar graph showing percentage change in immunoglobulins IgA, IgG2, IgG3, and IgG4 in the extract, placebo and placebo cross over.

FIG. 2 provides a bar graph of the immunomodulatory effect of Withanolide glycoside in humans at the end of the 30th day and 60th day study period. The study shows that Withanolide glycoside is capable of modulating immunoglobulin (IgM, IgG, IgA, IgG2, IgG3, and IgG4) to a desired level. One group administered with Withanolide glycoside (test dose) was tested on 30th day and 60th day, another group was given placebo for 30 days, then switched to test dose of Withanolide glycoside for the next 30 days. The values for IgM and IgG are provided in FIG. 2(A) and values for IgA, IgG2, IgG3, and IgG4 are provided in FIG. 2(B). There is increase in IgM and IgG in test group compared to placebo group, significant increase is seen in the 60th day reading. With respect to IgA, IgG2, IgG3, and IgG4 the test group showed a consistent increase, and improvement was seen in placebo group crossed over to test group.

Overall increase in Cytokines was detected in test group compared to the placebo group. The increase in Cytokines was determined by the increase in the levels of IFNγ and IL4. After 30 days IFNγ levels increased by 39% and an IL4 levels increased by 82% in the test group, whereas, negligible change was seen in the placebo group. By the end of $60^{th}$ day an increase of 54% in IFNγ levels and an increase of 137% in IL4 level was observed. After the 30-day study period, the test group reported significant increase in TBNK cells. Whereas, in the placebo group TBNK cells showed significant decrease. TBNK cells level is determined by testing for CD45, CD3, CD4, CD8, CD19 and NK cell levels. After the 30-day study period, the test group reported 12% increase in CD45, 19% increase in CD3, 17% increase in CD4, 14% increase in CD8, 10% increase in CD19 and 19% increase in NK cells.

FIG. 3 provides a bar graph of leukocytes and B-cell response to administering Withanolide glycoside in humans at the end of the 30th day and 60th day of the study period. The study shows that Withanolide glycoside is capable of modulating leukocytes and B-cell to a desired level. One group administered with Withanolide glycoside (test dose)

was tested on 30th day and 60th day, another group was given placebo for 30 days, then switched to test dose of Withanolide glycoside for the next 30 days. The value for CD45 (leukocytes) is provided in FIG. 3(A) and values for CD19 (B-cell indicator) is provided in FIG. 3(B). There is increase in CD45 and CD19 in test group compared to placebo group, significant increase is seen in the 60th day reading.

Figure 4A:
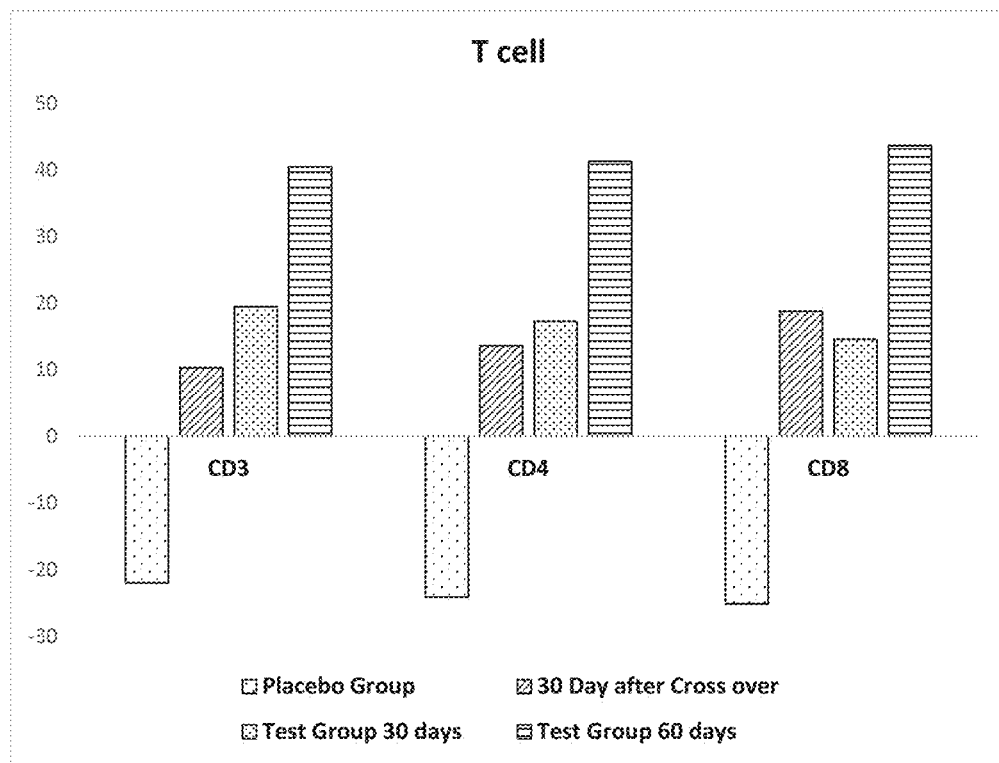
FIG. 4A is a bar graph showing percentage change in T cells in the extract, placebo and the placebo cross over.
Figure 4B:
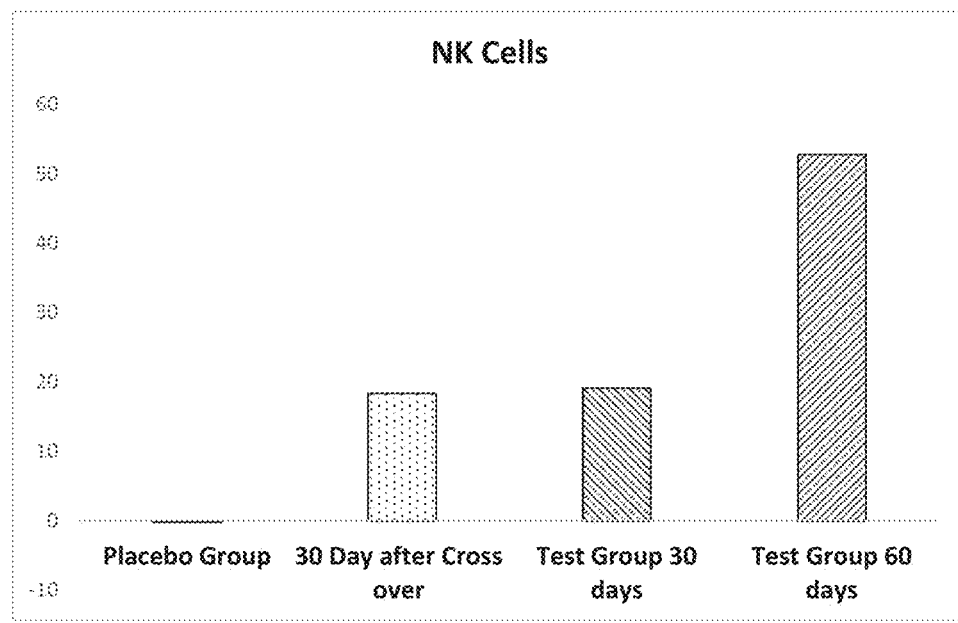
FIG. 4B is a bar graph showing percentage change in NK cells in the extract, placebo and the placebo cross over.

FIG. 4 provides a bar graph of T-cells and NK-cells response to Withanolide glycoside in humans at the end of the 30th day and 60th day of the study period. The study shows that Withanolide glycoside is capable of modulating T-cells and NK-cells to a desired level. One group administered with Withanolide glycoside (test dose) was tested on 30th day and 60th day, another group was given placebo for 30 days, then switched to test dose of Withanolide glycoside for the next 30 days. The value for T-cells is provided in FIG. 4 (A) and values for NK-cells is provided in FIG. 4(B). There is increase in T-cells and NK-cells in test group compared to placebo group, significant increase is seen in the 60th day reading.

Figure 5:
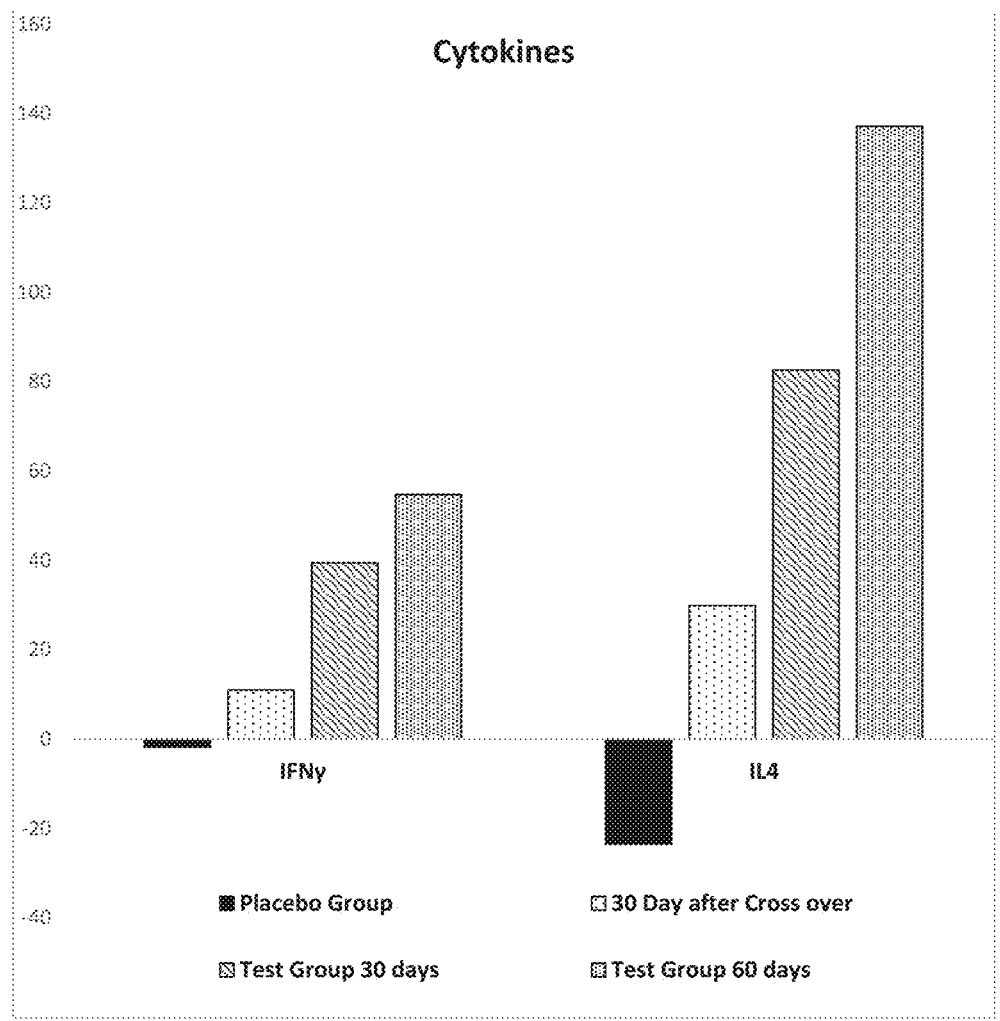
FIG. 5 is a bar graph showing percentage change in cytokines in the extract and placebo and the placebo cross over.

FIG. 5 provides a bar graph for cytokines response to Withanolide glycoside in humans at the end of the 30th day and 60th day study period. The study shows that Withanolide glycoside is capable of modulating IFNγ and IL4 to a desired level. One group administered with Withanolide glycoside (test dose) was tested on 30th day and 60th day, another group was given placebo for 30 days, then switched to test dose of Withanolide glycoside for the next 30 days. The values for IFNγ and IL4 are provided in FIG. 5. There is increase in IFNγ and IL4 in test group compared to placebo group, significant increase is seen in the 60th day reading.

In an embodiment, a method for non-therapeutic improvement of the immune system (immunomodulation) is disclosed, wherein improvement of immune system is manifested as increase in immunoglobulins (Ig's), cytokines and TBNK cells (T cells, B cells & NK cells) in a mammal in need, by administering an effective dose of 0.05-5 mg/kg body weight of Withanolide glycosides. The Withanolide glycosides is administered orally in the form of a composition in combination with Withaferin A and Withanolide A. Said Withanolide Glycosides are derived from *Withania* plant parts. In one embodiment the Withanolide Glycosides are derived from *Withania somnifera* plant parts, such as the leaves and roots of *Withania somnifera*. In one embodiment the composition further includes at least one aglycone.

In yet another embodiment, a method for non-therapeutic improvement of the immune system is disclosed, wherein improvement of immune system is manifested as increase in immunoglobulins (Ig's), cytokines and TBNK cells (T cells, B cells & NK cells) in a mammal in need, administering an oral composition having 60±5 mg withanolide glycoside. The composition further includes 14±4 mg Withanoside IV, 14±4 mg Withaferin A, and 5±3 mg withanolide A.

A method of enhancing bioavailability of the total withanolides in a subject is disclosed. The method includes administering the unit dosage of the oral composition of the extract of *Withania somnifera* to the subject in need thereof.

A method of enhancing bioavailability of the total withanolides is disclosed wherein the bioavailability of the total withanolides is about 10-fold to about 30-fold greater when administering the unit dosage of the oral composition of the extract of *Withania somnifera* having about 35% withanolide glycosides as compared to administering a standard alcoholic extract of *Withania somnifera* extract. Standard alcoholic extract has about 5.5% withanolide glycosides.

A method to increase the oral bioavailability of the withaferin A is disclosed. The method includes administering a unit dosage of the oral composition of the extract of *Withania somnifera* to a subject in need thereof.

A method to increase the oral bioavailability of withanoside IV by administering a unit dosage of an oral composition of the extract of *Withania somnifera* to a subject in need thereof is disclosed.

Another aspect disclosed is a method to enhance the bioavailability of withanolides. The method includes administering a combination of Withanoside IV and Withaferin A, in 1:10 to 10:1 w/w along with other withanolides.

In one embodiment, an enriched *Withania somnifera* extract is disclosed with 20 to 50% Withanolide Glycosides, wherein Withanoside IV makes 1 to 10% w/w of extract, and the extract also contains Withaferin A which makes up 1 to 10% w/w of the extract. The said extract has about 10-fold to about 30-fold more bioavailability than regular *Withania somnifera* extracts. Said regular extract could be a water extract, solvent extract or just powdered *Withania somnifera* plant parts. The bioavailability assessment is based on a study conducted by the inventor on human subjects. Subjects were given single doses of test compounds standardized to contain 185 mg total Withanolides. For the study four drugs were used, regular *Withania somnifera* extract with 2.5%, 5% Withanolides and 10% Withanolide Glycosides (WG10, wherein WG is an abbreviation for withanolide glycosides), and enriched *Withania somnifera* extract prepared from roots and leaves of *Withania somnifera* which was standardized with 35±3% Withanolide Glycosides (here after referred to as WG35). After administration of drugs blood was collected at different time intervals. Plasma was separated from blood and Withaferin A, Withanolide A, Withanoside IV and total Withanolides in each plasma sample were tested. The group treated with WG35 showed 56 times enhanced bioavailability of Withaferin A compared to *Withania somnifera* extract composition with 10% Withanolide Glycosides and 29 times enhanced bioavailability of Withaferin A compared to *Withania somnifera* extract composition with 2.5% Withanolides and over 44 times enhanced bioavailability of Withaferin A compared to regular *Withania somnifera* extract with 5% Withanolides. Bioavailability of Withanolide A after administering WG35 showed about 2.7 times bioavailability compared to subjects administered WG10 and 2.5% withanolides, and about 3.2 times better bioavailability compared to subjects administered with regular *Withania somnifera* extracts with 5% withanolides. WG35 showed about 5.5 times enhanced bioavailability of Withanoside IV compared to regular *Withania somnifera* extract with 2.5% Withanolides. Withanoside IV is not detected in 5% withanolides and WG10.

In an alternate embodiment, a composition of *Withania somnifera* root and leaf extract is disclosed with 10 to 30-fold more bioavailability than raw *Withania somnifera*. The composition includes a 50-1000 mg oral composition having 25-850 mg *Withania somnifera* extract with 10-300 mg withanolide glycoside. The composition further includes one or more Withanoside IV, Withaferin A. and withanolide A.

In a method to increase the bioavailability of the Withaferin A, a composition with a combination of Withanoside IV and Withaferin A, in 1:10 to 10:1 w/w is administered to a mammal. In an embodiment, when Withaferin A is administered orally along with a Withanoside IV the bioavailability of Withaferin A increases in blood by 20-fold compared to a subject administered only Withaferin A. One ratio of Withanoside IV to Withaferin A is 5:1 w/w. Alternatively, ratio of Withanoside IV to Withaferin A is 1:5 w/w. In an alternate embodiment, an increase of 10 to 30 fold in bioavailability of Withaferin A is observed when withanolides are administered at a dosage of 2 to 5 mg/Kg body weight and Withanoside IV:Withaferin A is in 1:10 to 10:1 w/w ratio. This assessment is made based on animal studies conducted by the inventor, where similar amount of standard Withaferin A standard Withanoside IV and *Withania somnifera* extract (with Withanoside IV:Withaferin A in 1:10 to 10:1 ratio respectively) were administered to rats and the bioavailability of Withaferin A and Withanoside IV was tested. Thirty times increase in the bioavailability of Withaferin A was noted in the animals administered with *Withania somnifera* extract compared to animals administered Withanoside IV or Withaferin A alone. The reason for high bioavailability of Withaferin A in *Withania somnifera* extract is due to the conversion of Withanoside IV into Withaferin A In a similar study conducted by the inventor, equal dose of *Withania somnifera* root and leaf extracts with 2.5% Withanolides (TW2.5) and 10% Withanolide Glycosides (WG10), *Withania somnifera* plant powder and the enriched *Withania somnifera* extract with 35±3% Withanolide Glycosides (WG35) is administered to the animals. The WG35 showed 52 times enhanced bioavailability of Withaferin A compared to WG10 and 79 times enhanced bioavailability of Withaferin A compared to TW2.5. Bioavailability of Withanolide A after administering WG35 showed 16 times bioavailability compared to animals fed with WG10 and 13 times better bioavailability compared to animals fed with TW2.5. WG35 showed 27 times enhanced bioavailability of Withanoside IV compared to WG10 and 43 times enhanced bioavailability of Withanoside IV compared to TW2.5.

In an embodiment, an extract of *Withania* plant parts is administered to increase the bioavailability of withanolides, wherein the composition of the extract is manipulated to have 20 to 50% w/w withanolide glycoside, and Withanoside IV and Withaferin A, in 1:10 to 10:1 w/w. Alternatively, an extract of *Withania* plant parts is administered to increase the bioavailability of withanolides, wherein the composition of the extract is manipulated to have 20 to 30% w/w withanolide glycoside, and Withanoside IV and Withaferin A are in 1:10 to 10:1 w/w. Alternatively, a purified extract of *Withania* plant parts is administered to increase the bioavailability of withanolides, wherein the composition of the extract is manipulated to have 30 to 40% w/w withanolide glycoside and Withanoside IV and Withaferin A, in 1:10 to 10:1 w/w, alternatively, an extract of *Withania* plant parts is administered to increase the bioavailability of withanolides, wherein the composition of the extract is manipulated to have 40 to 50% w/w withanolide glycoside, and Withanoside IV and Withaferin A, in 1:10 to 10:1 w/w. Alternatively, an extract of *Withania* plant parts is administered to increase the bioavailability of withanolides, wherein the composition of the extract is manipulated to have 35±3% w/w withanolide glycoside, and Withanoside IV and Withaferin A, in 1:10 to 10:1 w/w.

FIGS. 6-9 provide results of bioavailability studies. Four samples derived from *Withania somnifera* were tested for bioavailability of active components (Withaferin A, Withanolide A, Withanoside IV, and Total withanolides) on humans. The *Withania somnifera* samples are *Withania somnifera* extract with 2.5% withanolides (WG2.5), 35±3% withanolide glycoside (WG35), 5% total withanolides (WG5), and 10% Withanolide glycoside (WG10). All subjects were given single doses of drug standardized to contain 185 mg total withanolides.

Figure 6A:
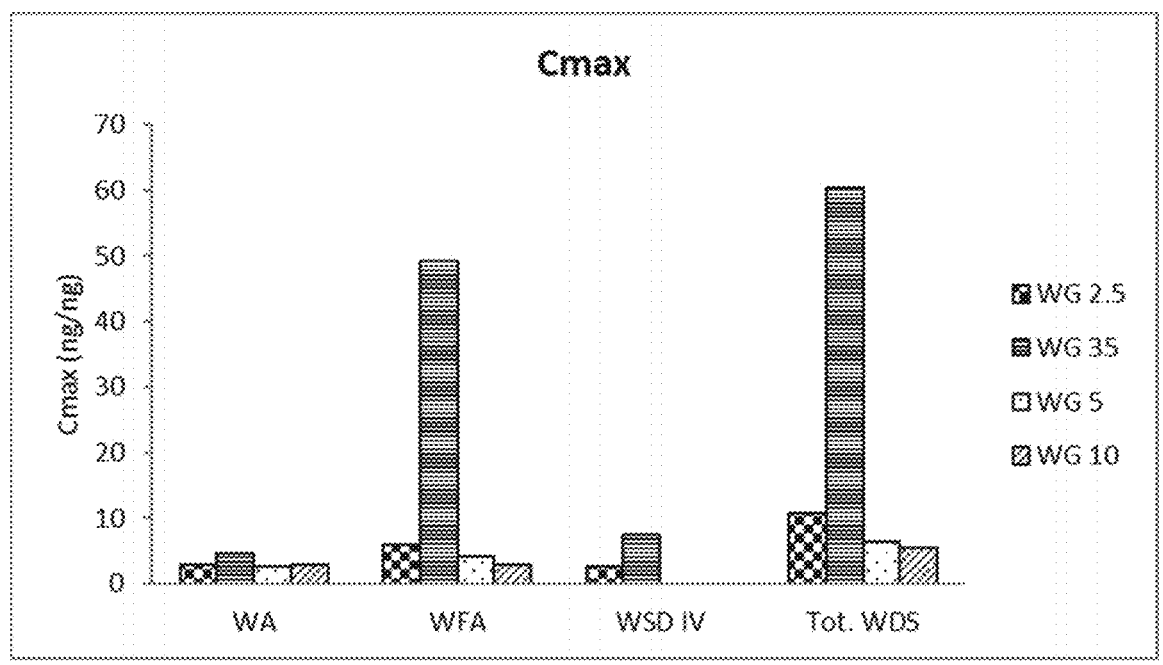
FIG. 6A is a bar graph showing mean Cmax for each extract from Example 8.
Figure 6B:
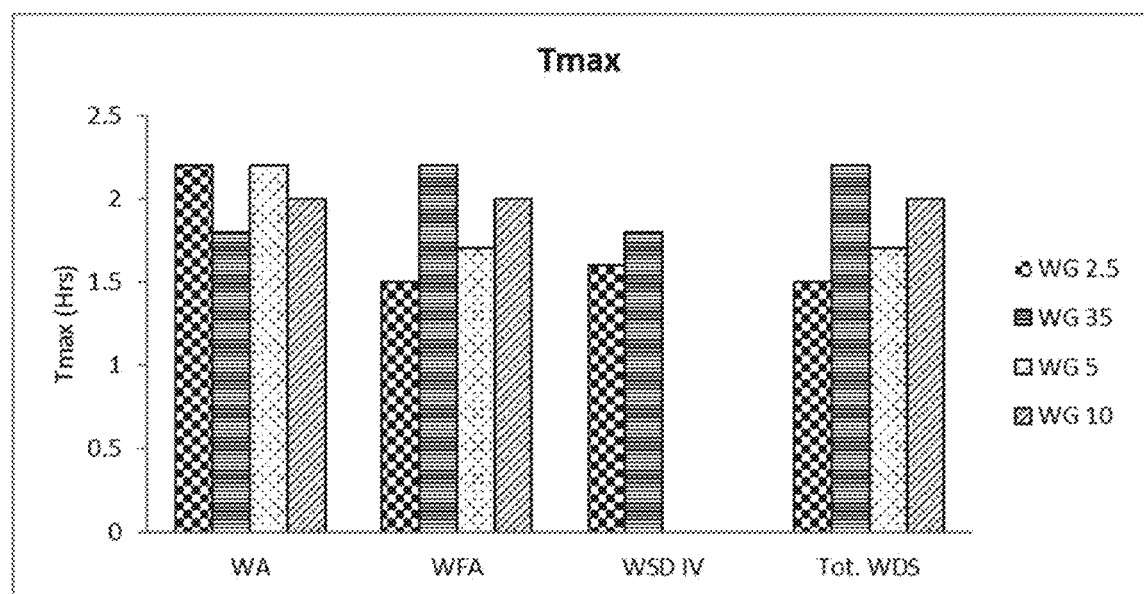
FIG. 6B is a bar graph showing mean Tmax for each extract from Example 8
Figure 7:
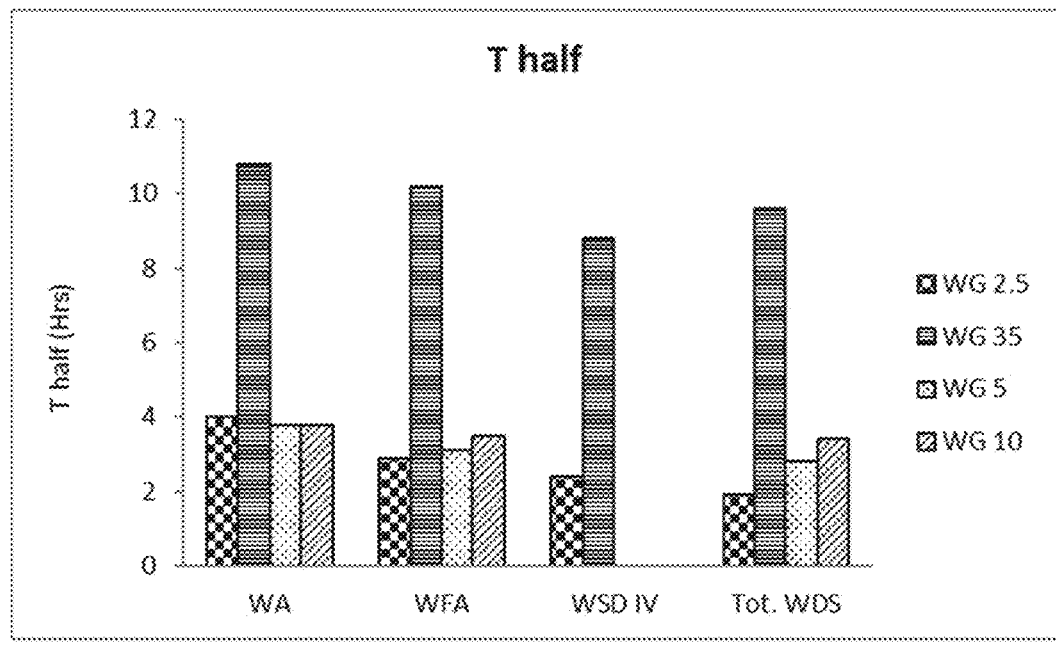
FIG. 7 is a bar graph showing mean T half for each extracts from Example 8.
Figure 8:
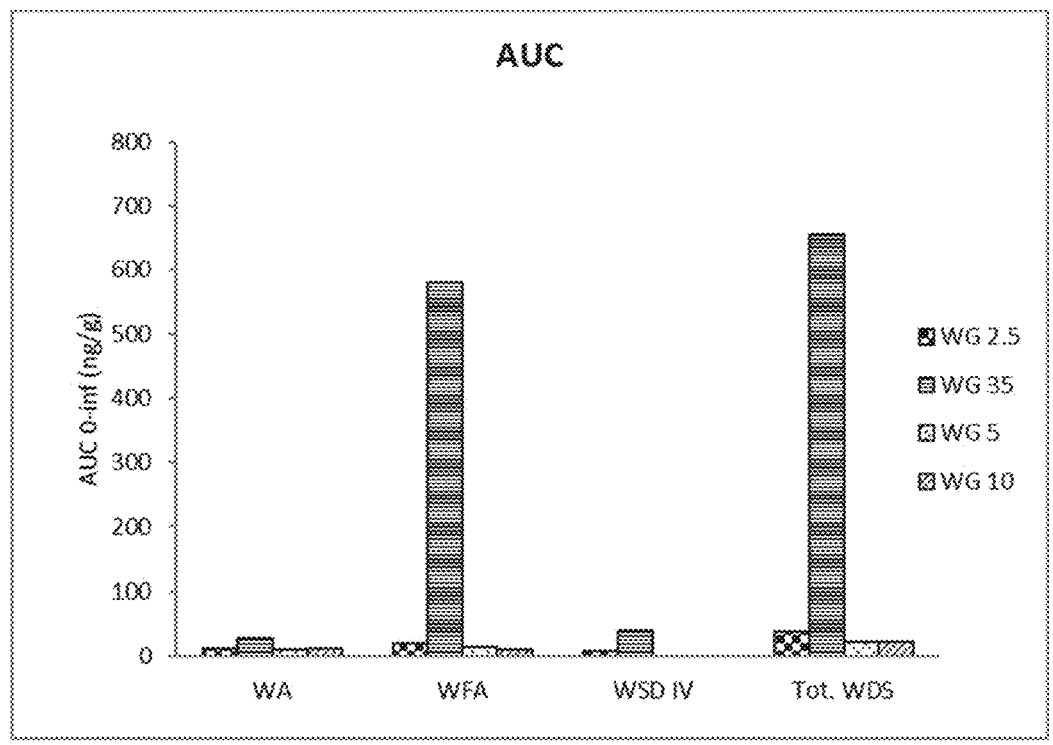
FIG. 8 is a bar graph showing mean area under the curve (AUC) for each extracts in Example 8.
Figure 9:
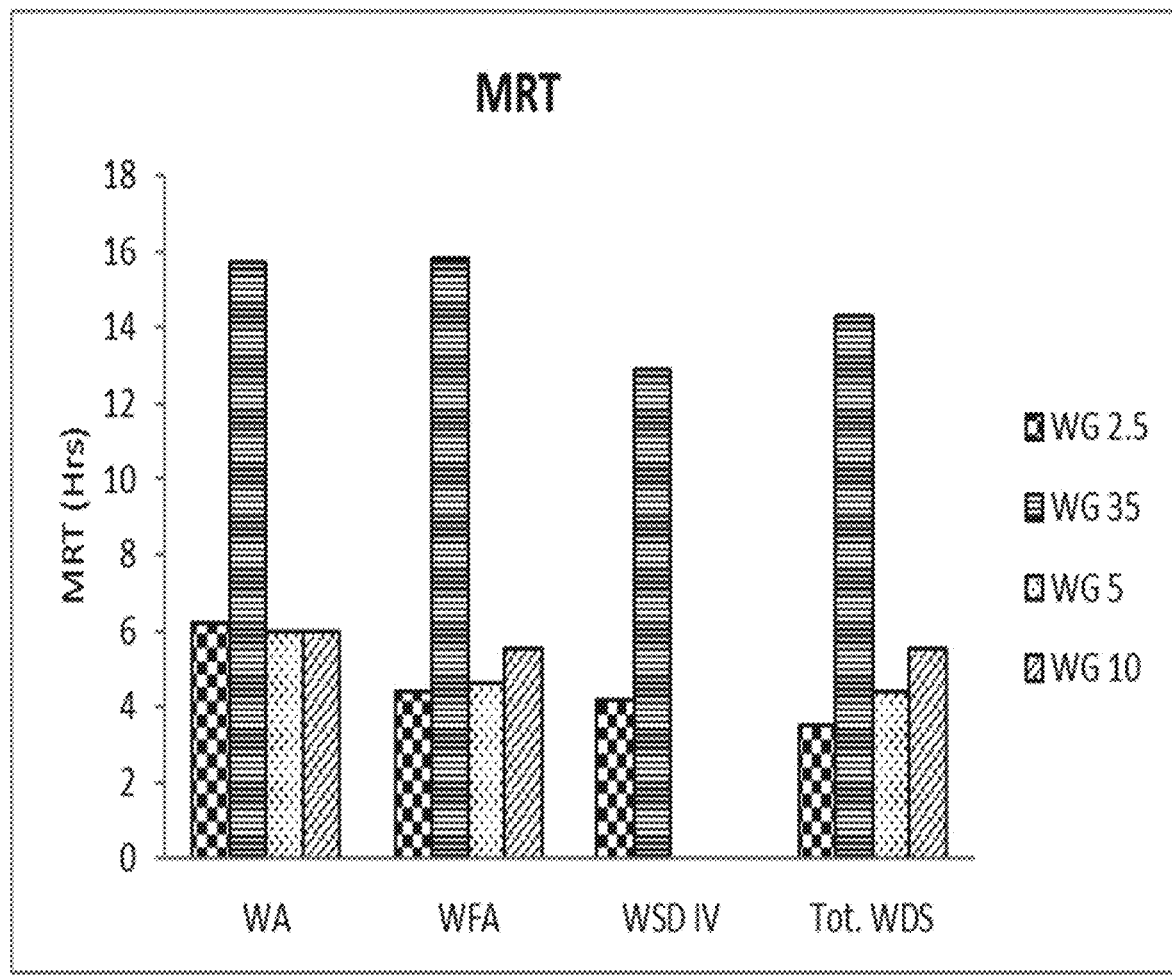
FIG. 9 is a bar graph showing mean MRT for each extracts from Example 8.

Cmax (maximum concentration reached) for Withaferin A, Withanolide A, Withanoside IV, and Total withanolides is provided in FIG. 6(A). Tmax (time to reach Cmax) is provided in FIG. 6(B). WG35 showed highest Cmax and lowest time to reach that Cmax for all the active components.

T half (the period of time that it takes for the concentration or amount in the body of that drug to be reduced by exactly one half) for Withaferin A. Withanolide A, Withanoside IV, and Total withanolides is provided in FIG. 7. WG35 showed highest T half for all the active components.

AUC (area under the curve, reflects the actual body exposure to drug after administration) for Withaferin A, Withanolide A. Withanoside IV, and Total withanolides is provided in FIG. 8. WG35 showed highest AUC for all the active components.

MRT (mean residence time, period for which drug stays in the body) for Withaferin A. Withanolide A. Withanoside IV, and Total withanolides is provided in FIG. 9. WG35 showed highest MRT for all the active components.

Another aspect of the discloser is a method to reduce stress in an animal or human when an effective dose of Withanolide glycosides is administered, more specifically when WG35 is administered. Stress is simply a reaction to a stimulus that disturbs the physical or mental equilibrium. It is considered to be any condition which results in perturbation of the body's homeostasis. Within seconds of an acutely stressful event, norepinephrine is released from nerve endings in preparation for a rapid response, and the adrenal glands release epinephrine and norepinephrine into the bloodstream, resulting in the familiar fight or flight response. Within minutes of a stressful event (and possibly lasting for several hours), a much more complex interaction between the nervous and endocrine systems and other forms of internal communication occurs, resulting in an intricate stress adaptation response. Anoxia Stress Tolerance Test was conducted on rats to study the effect and efficacy of Withanolide glycosides on stress. Albino Wistar rats of either sex weighing were selected and divided into groups and were treated with different drugs including WG35 and other *Withania somnifera* plant extracts. Animals were treated for the 3 weeks. At the end of 1st, 2nd and 3rd 1 hour after the treatment stress was induced by placing each animal individually in the hermetic vessel of 1 L capacity to record anoxia tolerance time. The time duration of entry of the animal into the hermetic vessel and the appearance of the first convulsion was taken as time of anoxia, a significant increase in anoxia stress tolerance (AST) time was observed in group treated with WG35, an increase of about 75% on the $1^{st}$ week, over 100% on the second week and over 150% by the $3^{rd}$ week. A method to reduce stress in a subject in need by administering an effective dose of WG35. The effective dose ranges from about 100 mg to 400 mg. The effective dose can be about 240 mg of WG35 for a mammal, wherein the mammal is a human.

In another embodiment, a method for non-therapeutically reducing anxiety in a canine in need by administering effective dose of withanolide glycoside. The Withanolide Glycosides is administered orally in the form of a composition in combination with Withaferin A. Withanolide A and at least one aglycones. Said Withanolide Glycosides are derived from *Withania* plant parts. In one embodiment the Withanolide Glycosides are derived from *Withania somnifera* plant parts, such as the leaves and roots of *Withania somnifera*.

Gamma aminobutyric acid (GABA) is a naturally occurring amino acid that works as a neurotransmitter in the brain.

Neurotransmitters function as chemical messengers. GABA is considered an inhibitory neurotransmitter because it blocks, or inhibits certain brain signals and decreases activity in the nervous system. Histamine reduces uptake of GABA. Activation of GABA and increased endogenous histamine helps to improve the quality of sleep.

Another aspect of the disclosure is a method for non-therapeutically increasing the level of GABA and Histamine in the brain of a person in need by administering withanolide glycoside. In an embodiment, a method for non-therapeutically improving the quality of sleep in a person in need is attained by administering effective dose of withanolide glycoside. The Withanolide Glycosides is administered orally in the form of a composition in combination with Withaferin A, Withanolide A and at least one aglycones. Based on the studies conducted on the effect of *Withania somnifera* extract on pentobarbital induced sleep activity on mice at 5 mg/Kg and 25 mg/kg dosage showed 12% and 22% decrease in onset time of sleep and 14% and 35% increase in duration of sleep compared to the negative control group. The effective dose ranges from 0.05-5 mg/kg body weight of withanolide glycoside to a mammal, wherein the mammal is a human. The effective dose ranges from about 60 mg to about 240 mg of WG35, more preferably twice daily for a human. Said Withanolide Glycosides are derived from *Withania* plant parts. In one embodiment the Withanolide Glycosides are derived from *Withania somnifera* plant parts, such as the leaves and roots of *Withania somnifera*.

Figure 10:
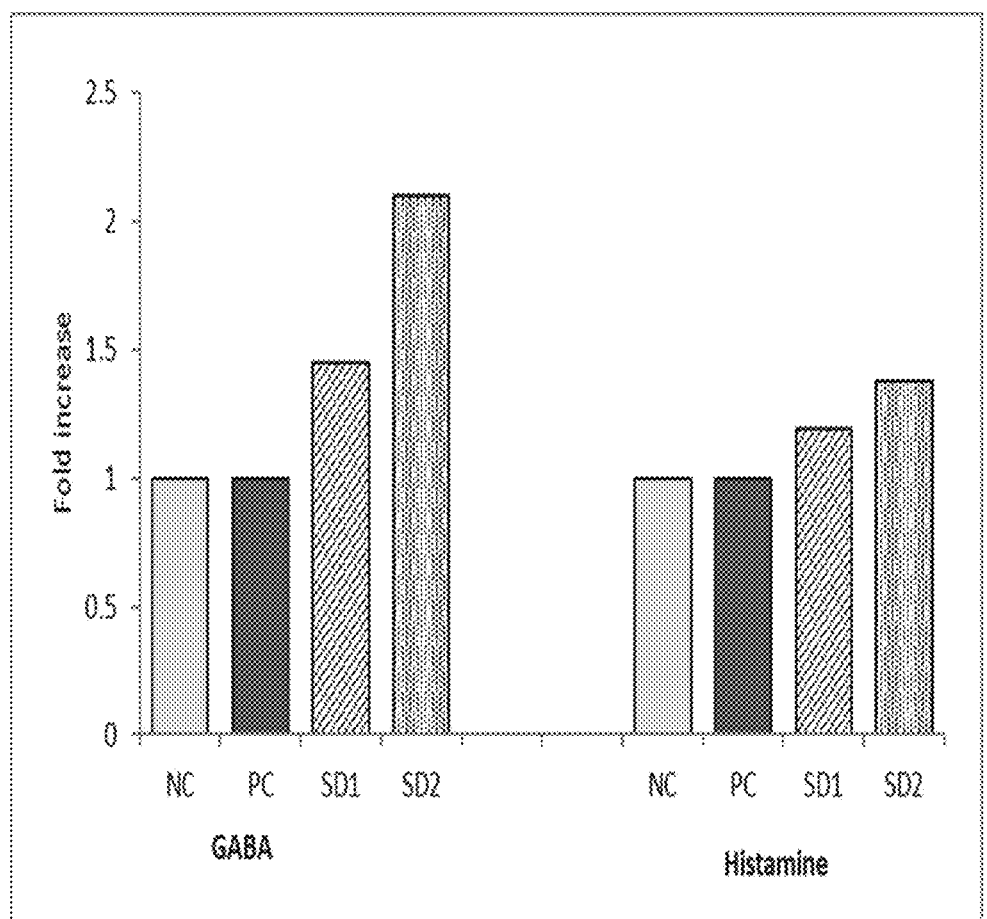
FIG. 10 is a bar graph showing a comparison of fold enhancement of extracts from Example 8.

FIG. 10 provides results of effect of *Withania somnifera* extract on the expression of GABA and histamine receptors was studied in rat glioblastoma (C6) cell line. For the invitro study negative cell control (NC, rat glioblastoma (C6) cell line) was cell cultured with growth media and positive control (PC, rat glioblastoma (C6) cell line) was cell cultured with GABA and study drug used for this experiment was *Withania somnifera* extract (WG35) at 15 µg/ml (SD1) and 30 µg/ml (SD2). There was an increase in gene expression levels of GABA and histamine receptors after administering *Withania somnifera* extract at dosages of 15 & 30 µg/ml compared to control.

In another embodiment, a method to improve testosterone levels in a mammal in need of by administering about 60 to 240 mg WG35. More specifically a method to improve on physical activity, vitality and reducing fatigue in a mammal in need of by administering an effective dose of WG35. The effective dose being about 60 to 240 mg for an adult human.

A method of treatment by administering a dosage of the extract of *Withania somnifera* of is disclosed. The dosage ranges from about 60 mg to about 240 mg. The dosage is administered to a mammal once a day. Methods of treatment by administering the dosage twice a day to a mammal are also disclosed. The mammal can be a human.

A method of non-therapeutically improving immune system of a mammal by administering a unit dosage of an oral composition of the extract of *Withania somnifera* to the mammal in need thereof is disclosed. The method of treatment improves a parameter of the immune system such as immunoglobulins, cytokines. T-cells, B-cells or natural killer (NK)-cells.

A method of treatment by administering a oral composition of the extract of *Withania somnifera* to a mammal in need thereof is disclosed. The method of treatment in the mammal includes increasing gene expression of Gamma amino butyric acid, increasing histamine receptor gene expression, decreasing onset time of sleep, increasing duration of sleep, increasing delta band during sleep, lowering stress or decreasing inflammation.

A method of increasing swimming endurance in a mammal by administering a unit dosage of an oral composition of an extract of *Withania somnifera* to the mammal in need thereof is disclosed.

EXAMPLES

Specific embodiments of the invention will now be demonstrated by reference to the following general methods of manufacture and treatment. It should be understood that these examples are disclosed solely by way of illustrating the invention and should not be taken in any way to limit the scope of the present invention. They are in no way limiting on the preceding description.

Example 1

Method of Extracting *Withania somnifera* with 60% Ethanol

Plant parts (roots and leaves) of *Withania somnifera* were collected (100 Kg). The plant parts were cleaned and dried. After drying, the plant parts were powdered to form a powder of *Withania somnifera*.

The powder of *Withania somnifera* was extracted with 60% ethanol. The powder was refluxed with 60% ethanol (300 L) at the boiling temperature (70 to 80° C.) of ethanol for one hour to obtain a first residue and a first supernatant. The first residue was then further extracted two more times (for a total of 3 times) with three times the quantity of ethanol at each time resulting in second and third supernatants. The residue and supernatants were separated. All the supernatants were pooled and concentrated in an Agitated thin film evaporator (ATFE) to form a concentrated ethanol extract, (Sample 1). The total withanolides content of Sample 1 was about 7±3% by weight as determined by HPLC method. Sample 1 had 5.5% withanolide glycosides.

Example 2

Method of Extracting *Withania somnifera* with 60% Methanol

Plant parts (roots and leaves) of *Withania somnifera* were collected (100 Kg). The plant parts were cleaned and dried. After drying, the plant parts were powdered to form powder of *Withania somnifera*.

The powder of *Withania somnifera* was extracted with 60% methanol. The powder was refluxed with 60% methanol (300 L) at the boiling temperature (60-70° C.) of methanol for one hour to obtain a residue and supernatant. The residue was then further extracted two more times with three times the quantity of methanol at each time. The residue and supernatants were separated. All the supernatants were pooled and concentrated in an Agitated thin film evaporator (ATFE) to form a concentrated methanol extract, (Sample 2). The total withanolide content of Sample 2 was about 7±3% by weight as determined by HPLC method. The HPLC profile is provided in FIG. 11 (A). Sample 2 had 5.5% withanolide glycosides.

Example 3

Method of Enriching Ethanol Extract of *Withania somnifera*

About 20 Kg of Sample 1 (from Example 1) was absorbed on to a synthetic adsorbent by passing the sample 1 through a tower packed with synthetic adsorbent, and the synthetic adsorbent had a pore radius of 45 to 900 Angstrom. The synthetic adsorbent was initially eluted with water followed by water:ethanol solvent. The ratio of hydro-ethanolic solvent was determined based on tests for purity, based on the desired purity the synthetic adsorbent was eluted with water:ethanol solvent to obtain an extracted fraction. The fraction was concentrated in an Agitated thin film evaporator (ATFE) to form concentrated extract. The Concentrated fraction was fed into a vacuum stripper and dried under vacuum at above 500 mm of mercury to get powder of extract (WG35) of *Withania somnifera*. The powdered fraction of *Withania somnifera* contained about 35±3% Withanolide Glycosides by weight as determined by HPLC. Extract further contained Withaferin A 6±3%, Withanoside IV 6±3% by weight. The ratio of Withanoside IV:Withaferin A was found to range from about 1:3 w/w to 3:1 w:w because the percentage of withaferin A was a minimum of 3% by weight to a maximum of 9% by weight and Withanoside IV was about 3% by weight to about 9% by weight. So the ratio of Withanoside IV:Withaferin A was about 3:9 to about 9:3 which equals about 1:3 to about 3:1. The process yield was about 1.5 to 4%, more precisely about 3.5%. Yield of final product after extraction (total extract) was 3.5%.

Example 4

Method of Enriching Methanol Extract of *Withania somnifera*

About 20 Kg of Sample 2 (from Example 2) was absorbed on to a synthetic adsorbent by passing the sample 1 through a tower packed with synthetic adsorbent, and the synthetic adsorbent had a pore radius of 45 to 900 Angstrom. The synthetic adsorbent was initially eluted with water followed by water:ethanol solvent. The ratio of hydro-ethanolic solvent was determined based on tests for purity, based on the desired purity the synthetic adsorbent was eluted with water:ethanol solvent to obtain an extracted fraction. The fraction was concentrated in an Agitated thin film evaporator (ATFE) to form a concentrated extract. The Concentrated fraction was fed into a vacuum stripper and dried under vacuum at above 500 mm of mercury to get powder of extract (WG35) of *Withania somnifera* (sample 3). The powdered fraction of *Withania somnifera* contained about 35±3% Withanolide Glycosides by weight as determined by HPLC. Extract further contained Withaferin A 6±3%, Withanoside IV 6±3%. The ratio of Withanoside IV:Withaferin A was found to range from about 1:3 w/w to 3:1 w/w because the percentage of withaferin A was a minimum of 3% by weight to a maximum of 9% by weight and Withanoside IV was about 3% by weight to about 9% by weight. So the ratio of Withanoside IV:Withaferin A was about 3:9 to about 9:3 which equals about 1:3 to about 3:1. The process yield (yield of total extract) was about 3.5%.

Example 5

Immunomodulatory Effect of Withnolide Glycoside on Humans

The primary objective of the study was to determine the immunomodulatory effect of Withanolide glycoside at the end of the 30-day study period. The study included 24 adult male and female healthy human subjects of 45-72 years of age. The main inclusion criteria were a BMI<30, generally good health status confirmed by clinical history, physical exam, and routine blood analysis. It consists of a double blinded 30-day period. The mean change in immunoglobulins (Ig's), cytokines and TBNK cells (T cells, B cells & NK cells) and safety parameters were evaluated. Subjects were randomized to receive a daily dose of either one 180 mg capsule containing 60 mg of *Withania somnifera* extract with 21 mg Withanolide Glycosides (Sample 3) or a matching placebo containing roasted rice powder for 30 days.

Figure 3A:
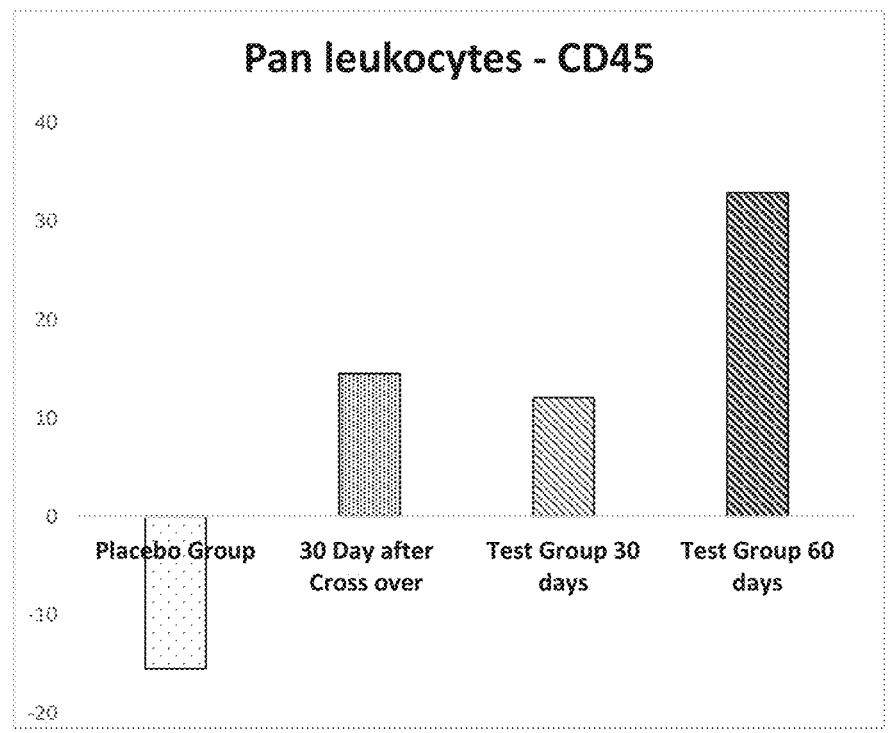
FIG. 3A is a bar graph showing percentage change in CD45 (leukocytes) in the extract, placebo and the placebo cross over.
Figure 3B:
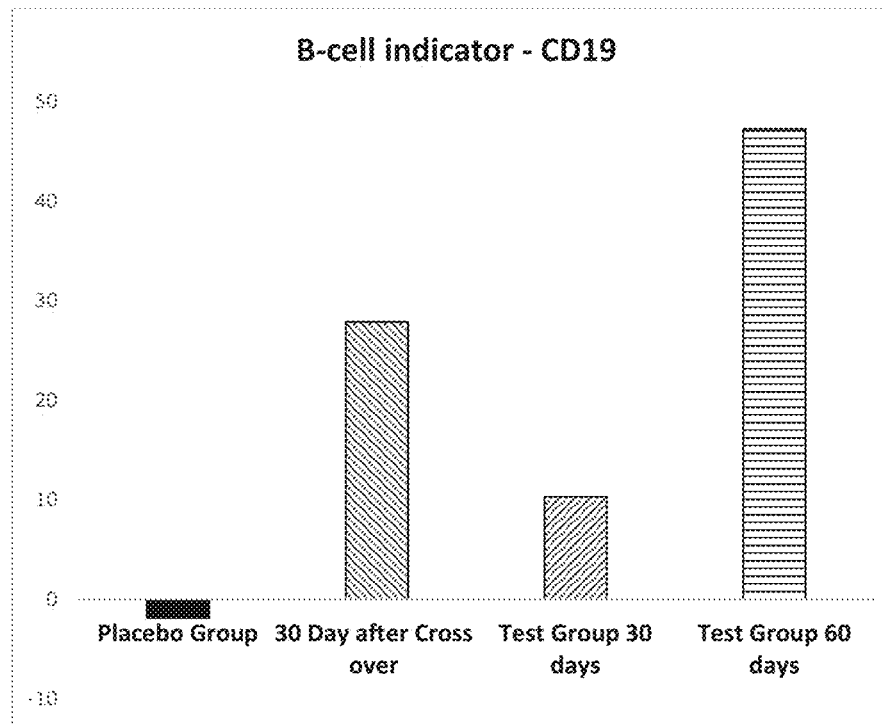
FIG. 3B is a bar graph showing percentage of CD19 (B-cell indicator) in the extract, placebo and the placebo cross over.

Percentage change in immunoglobulins indicators in the test group and placebo and the placebo cross over is provided in Table 1 and FIGS. 3(A) and 3(B).

TABLE 1

| Immunoglobulin Indicators | Placebo Group | Placebo Group 30 Day after Cross over | Test Group after 30 days | Test Group after 60 days |
|---|---|---|---|---|
| IgG | 1.65% | 5.4% | 5.09% | 11.57% |
| IgM | 0.56% | 0.67% | 0.83% | 9.14% |
| IgA | 2.93% | 5% | 5.96% | 8.27% |
| IgG2 | −10.79% | 3% | 2.52% | 5.91% |
| IgG3 | 17.03% | 0.79% | 2.52% | 6.8% |
| IgG4 | 5.89% | 2.01% | 4.05% | 9.66% |

The within-group analysis of the Immunoglobulins (Ig) indicates that there was a significant increase in the level of IgA, IgG2, IgG3, IgG4, IgG, and IgM in the test group at the end of the 30-day study. The placebo group did not show a significant change in any of the Ig from baseline to the end of the 30-day study period. (see FIGS. 2(A) and 2(B)). Levels of all the Ig in the participants crossed over to the test group in the extension study showed a significant increase. The participants who continued to take the test intervention for the total period of 60 days had a significant increase in all their immunoglobulin levels (See FIGS. 2(A) and 2(B)). The immunoglobulins were similar between the groups at baseline and the end of 30 days. The placebo did not have a statistically significant increase at the end of 30 days, but the placebo crossed over to the test intervention had a statistically significant increase and was clinically relevant.

Percentage change in Pan leukocytes, T cell, B Cell. NK Cell, and cytokines in the test group and placebo and the placebo cross over is provided in Table 2 and FIGS. 3 to 5.

TABLE 2

| | Indicators | Placebo Group | Placebo Group 30 Day after Cross over | Test Group after 30 days | Test Group after 60 days |
|---|---|---|---|---|---|
| Pan leukocytes | CD45 | −15.44 | 14.52 | 12.07 | 32.88 |
| T cell | CD3 | −22 | 10.28 | 19.46 | 40.41 |
| | CD4 | −24.13 | 13.57 | 17.26 | 41.26 |
| | CD8 | −25.13 | 18.76 | 14.57 | 43.6 |
| B Cell | CD19 | −1.87 | 27.88 | 10.31 | 47.29 |
| NK Cell | NK | −0.15 | 18.26 | 19.08 | 52.71 |
| Cytokines | IFNγ | −1.77 | 10.94 | 39.44 | 54.69 |
| | IL4 | −23.5 | 29.89 | 82.53 | 137.06 |

The within-group analysis of the absolute counts of lymphocytes indicated a significant increase in the number of CD45+, CD3+, CD4+, CD8+, and CD19+ cells in the test group at the end of the 30-day study. The placebo group showed a significant decrease in CD45, CD3, CD4, and CD8, and no significant change in the CDI 9 cells (see FIG. 3 and FIG. 4). The CD45, CD3, CD4, CD8, CD19 & CD16/56 counts in the participants crossed over to the test group in the extension study showed a significant increase.

The participants who continued to take the test product for the total period of 60 days also had a significant increase in their CD45, CD3, CD4, CD8, and CD19 counts. A between the group analysis revealed that CD45, CD3, CD4, CD8, and CD19 were similar between the groups at baseline and significantly increased in the test group at the end of 30 days. The placebo had a statistically significant and clinically relevant decrease except for CD19 & NK cells, this might the effect of seasonal effect on the immune system. Nevertheless, the placebo crossed over to the test intervention had a statistically significant increase and was clinically relevant.

The within-group analysis of the cytokines indicates that there was a significant increase in the level of IFN γ and IL4 in the test group at the end of the 30-day study. The placebo group did not show any significant change for IFNγ & IL4 (see FIG. 5). IFNγ & IL4 levels in the participants crossed over to the test group in the extension study showed a significant increase.

The participants who continued to take the test product for the total period of 60 days had a significant increase in their IL4 levels and no significant change in IFNγ. IFNγ & IL4 was similar between the groups at baseline and significantly increased in the test group at the end of 30 days. The placebo did not have a statistically significant increase for IL4 & IFNγ. The placebo crossed over to the test intervention had a statistically significant increase and clinically relevant for IFNγ but not for IL4.

Example 6

Bioavailability Study for Withaferin A, Withanolide A, Withanoside IV in Plasma of Rat Albino rats weighing 200-220 gm of both sexes were used for the study. The rats were kept individually in polypropylene cages and maintained in well ventilated room under normal and uniform conditions like 12 hours light and dark cycle and at 26±2° C. Water and feed were given ad-libitum. The animals were divided into 5 groups and 4 animals were used for each group. After the acclimatization period, the animals were fasted overnight before administration of test products. Dosage was 500 mg per Kg bodyweight of the animal Animals were divided as shown in below.

| Group 1 | Vehicle. |
|---|---|
| Group 2 | Regular *Withania somnifera* extract (2.5% Withanolides). |
| Group 3 | *Withania somnifera* root + leaf extract with 10% Withanolide Glycosides. |
| Group 4 | *Withania somnifera* root + leaf powder. |
| Group 5 | *Withania somnifera* root + leaf extract with 35 ± 3% Withanolide glycosides. |

Each sample was orally administered. The blood samples were collected at several time points. The plasma was separated and analysed for Withaferin A. Withanolide A and Withanoside IV content.

Comparative pharmacokinetic data (Cmax, Tmax and AUC) of Withaferin A, Withanolide A and Withanoside IV after administering different *Withania somnifera* extracts is shown in table 3.

TABLE 3

| | Cmax (ng/ml) | Tmax (h) | AUC (0-12 h) (ng · h/ml) |
|---|---|---|---|
| Withaferin A | | | |
| Group 1 | 0 | 0 | 0 |
| Group 2 | 7.9 | 0.92 | 11.2 |
| Group 3 | 11.2 | 0.78 | 16.9 |
| Group 4 | 12.5 | 0.81 | 18.4 |
| Group 5 | 73.5 | 0.55 | 887 |
| Withanolide A | | | |
| Group 1 | 0 | 0 | 0 |
| Group 2 | 2.5 | 0.69 | 5.3 |
| Group 3 | 2.3 | 0.82 | 4.5 |
| Group 4 | 2.2 | 0.61 | 4.1 |
| Group 5 | 8.1 | 0.31 | 71.2 |
| Withanoside IV | | | |
| Group 1 | 0 | 0 | 0 |
| Group 2 | 1.7 | 0.79 | 1.3 |
| Group 3 | 2.3 | 0.72 | 2.1 |
| Group 4 | 1.5 | 0.82 | 1.2 |
| Group 5 | 31.2 | 0.59 | 55.8 |

Group 5 showed fifty-two times greater bioavailability of Withaferin A compared to Group 3, and seventy-nine-times greater bioavailability compared Group 2.

Bioavailability, of Withanolide A in Group 5 was sixteen times more bioavailability compared to Group 3, and thirteen-times better bioavailability compared to Group 2 animals. Group 5 showed twenty-seven times more bioavailability of Withanoside IV compared to Group 3 and 43 times more compared to Group 2.

Example 7

Bioavailability of Withaferin a and Withanoside IV in Animals

Albino rats weighing 200-220 gm of both sexes were used for the study. The rats were kept individually in polypropylene cages and maintained in a well-ventilated room under normal and uniform conditions like 12 hours light and dark cycle and at 26±2° C. Water and feed were given ad-libitum. After the acclimatization period, the animals were fasted overnight before administration of test products. Overnight fasted rats were divided into 3 groups, of 6 animals each.

Group 1 were administered standard Withaferin A (15 mg/kg p.o,),

Group 2 were administered standard Withanoside IV (15 mg/kg/day p.o,),

Group 3 were administered *Withania somnifera* extract (WG35) (500 mg/kg/day p.o) respectively.

*Withania somnifera* WG35 extract had 35±3% w/w Withanolide glycosides, 6±3% w:w Withaferin A and 6±3% w/w withanoside IV. Immediately after drug administration, 0.5 ml of blood was withdrawn at 0, 0.5, 1, 1.5, 2, 4, 6, 8 and 12 hours. Plasma samples were separated and Withaferin A and Withanoside IV were detected.

Bioavailability of Withaferin A and Withanoside IV after administration of standard Withaferin A, Withanoside IV and *Withania somnifera* extract is shown in Table 4.

TABLE 4

| Test groups | Withaferin A Cmax (ng/ml) | Withaferin A AUC (0-12 h) (ng · h/ml) | Withanoside IV Cmax (ng/ml) | Withanoside IV AUC (0-12 h) (ng · h/ml) |
|---|---|---|---|---|
| Group 1 | 28 | 30.2 | ND | ND |
| Group 2 | 13.5 | 18 | 10.2 | 14 |
| Group 3 | 74.8 | 903 | 29.2 | 53.2 |

Bioavailability of Withaferin A was 30 times higher in Group 3 compared to standard Withaferin A at the same dosage. The reason for high bioavailability of Withaferin A in *Withania somnifera* extract was due to the conversion of Withanoside IV into Withaferin A. After administration of Withanoside IV alone, Withaferin A was detected along with Withanoside IV in plasma samples confirming some relation between Withanosides metabolites and Withaferin A.

Example 8

Bioavailability of Different *Withania somnifera* Extracts in Human Beings

The absorption of active constituents like Withaferin A, Withanolide A, Withanoside IV after oral administration of different *Withania somnifera* extracts was studied in healthy male volunteers. The subjects were divided into 4 groups having 12 subjects in each group. Subjects were fasted overnight before administration of the drug. All subjects were given single doses of drug standardized to contain 185 mg total withanolides. Subjects received following samples along with 250 ml of water at ambient temperature after the overnight fast:

Group 1—a single dose (7400 mg) of regular *Withania somnifera* extract (2.5% withanolides) (WG2.5);

Group 2—a single dose (480 mg) of *Withania somnifera* extract standardized with 35±3% withanolide glycoside (WG35);

Group 3—a single dose (3700 mg) of *Withania somnifera* extract standardized with 5% total withanolides (WG5); and Group 4—a single dose (1800 mg) of *Withania somnifera* extract standardized with 10% Withanolide glycoside (WG10).

Blood was collected at different time intervals. After a wash out period of one week the subjects were crossed-over to the other drug as given below table 5.

TABLE 5

|  | Period 1 | Period 2 | Period 3 | Period 4 |
|---|---|---|---|---|
| Group 1 | WG2.5 | WG35 | WG5 | WG10 |
| Group 2 | WG35 | WG5 | WG10 | WG2.5 |
| Group 3 | WG5 | WG10 | WG2.5 | WG35 |
| Group 4 | WG10 | WG2.5 | WG35 | WG5 |

In each period, blood was collected at different time intervals at baseline, 0.25, 0.50, 0.75, 1.00, 1.50, 2.00, 2.50, 3.00, 3.50, 4.00, 5.00, 6.00, 9.00, 12.00, 16.00 and 24.00 post drugs. Plasma was separated from blood and Withaferin A, Withanolide A, Withanoside IV and total withanolides in each plasma sample were found. The results are shown in FIGS. 6, 7, 8 and 9.

Mean concentration of total withanolides after administering different study drugs is show in Table 6.

TABLE 6

| Groups | Cmax (ng/gm) | Tmax (Hrs) | T half (Hrs) | AUG 0-inf (ng/gm) | MRT (Hrs) |
|---|---|---|---|---|---|
| WG2.5 | 10.8 | 1.5 | 1.9 | 37.8 | 3.5 |
| WG35 | 60.4 | 2.2 | 9.6 | 656.5 | 14.3 |
| WG5 | 6.3 | 1.7 | 2.8 | 22.4 | 4.4 |
| WG10 | 5.6 | 2 | 3.4 | 20.8 | 5.5 |

Mean concentration of each parameter in different study drugs is shown in Table 7.

TABLE 7

| Withanolides | Groups | Cmax (ng/gm) | Tmax (Hrs) | T half (Hrs) | AUC 0-inf (ng/gm) | MRT (Hrs) |
|---|---|---|---|---|---|---|
| Withanolide A | WG2.5 | 2.9 | 2.2 | 4 | 10.7 | 6.2 |
|  | WG35 | 4.7 | 1.8 | 10.8 | 28.4 | 15.7 |
|  | WG5 | 2.6 | 2.2 | 3.8 | 9 | 6 |
|  | WG10 | 2.9 | 2 | 3.8 | 10.6 | 6 |
| Withaferin A | WG2.5 | 5.9 | 1.5 | 2.9 | 19.7 | 4.4 |
|  | WG35 | 49.1 | 2.2 | 10.2 | 580.2 | 15.8 |
|  | WG5 | 4.1 | 1.7 | 3.1 | 13.2 | 4.6 |
|  | WG10 | 2.8 | 2 | 3.5 | 10.3 | 5.5 |
| Withanoside IV | WG2.5 | 2.7 | 1.6 | 2.4 | 7 | 4.2 |
|  | WG35 | 7.4 | 1.8 | 8.8 | 38.4 | 12.9 |
|  | WG5 | ND | ND | ND | ND | ND |
|  | WG10 | ND | ND | ND | ND | ND |

Fold increase or decrease of bioavailability of *Withania somnifera* extract compared to other study drugs is shown in table 8.

TABLE 8

|  |  | Fold enhancement (in bioavailability) of WG35 over WG2.5 | WG5 | WG10 |
|---|---|---|---|---|
| Withanolide A | Cmax | 1.6 | 1.8 | 1.6 |
|  | Tmax | 0.8 | 0.8 | 0.9 |
|  | T half | 2.7 | 2.8 | 2.9 |
|  | AUC 0-inf | 2.7 | 3.2 | 2.7 |
|  | MRT | 2.5 | 2.6 | 2.6 |
| Withaferin A | Cmax | 8.4 | 11.9 | 17.6 |
|  | Tmax | 1.5 | 1.3 | 1.1 |
|  | T half | 3.5 | 3.3 | 2.9 |
|  | AUC 0-inf | 29.4 | 44 | 56.1 |
|  | MRT | 3.6 | 3.5 | 2.9 |
| Withanoside IV | Cmax | 2.8 | ND | ND |
|  | Tmax | 1.1 | ND | ND |
|  | T half | 3.7 | ND | ND |
|  | AUC 0-inf | 5.5 | ND | ND |
|  | MRT | 3.1 | ND | ND |

TABLE 8-continued

| | | Fold enhancement (in bioavailability) of WG35 over | | |
|---|---|---|---|---|
| | | WG2.5 | WG5 | WG10 |
| Total withanolides | Cmax | 5.6 | 9.5 | 10.8 |
| | Tmax | 1.5 | 1.3 | 1.1 |
| | T half | 5.1 | 3.4 | 2.8 |
| | AUC 0-inf | 17.4 | 29.3 | 31.5 |
| | MRT | 4.1 | 3.3 | 2.6 |

Based on the data from table 8, with respect to total withanolides WG35 has higher Cmax than WG2.5, WG5, and WG10, at least 10.8 fold higher. WG35 also reached Cmax almost an hour earlier compared to other groups. Elimination of total withanolides was much slower in WG35 group compared to other group, total withanolides got eliminated 5 times faster in WG2.5, 3 times in WG5 and 2.8 times faster in WG10. The AUC of WG 35 was 29 times than WG 5, and about 17 times of WG 2.5 and 31 times of WG10.

With respect to Withanolide A WG35 had higher Cmax than WG 2.5. WG 5 and WG10, at least 3-fold higher. WG35 also reached Cmax almost an hour earlier compared to other groups. Elimination of Withanolide A was much slower in WG35 group compared to other group, Withanolide A got eliminated 2.7 times faster in WG2.5, 2.8 times in WG5 and 2.9 times faster in WG10. The AUC of WG 35 was 3.2 times than WG 5, about 2.7 times of WG 2.5 and 2.7 times of WG10.

With respect to Withaferin A WG35 had higher Cmax than WG 2.5, WG 5 and WG 10, at least 8.4 fold higher than WG 2.5 and 17.6 fold higher than WG10. WG35 also reached Cmax almost an hour earlier compared to other groups. Elimination of Withaferin A was much slower in WG35 group compared to other group, Withaferin A got eliminated 3.5 times faster in WG 2.5, 3.3 times in WG 5 and 2.9 times faster in WG10. The AUC of WG 35 was 56 times than WG10, and 29.4 times than WG 2.5 and 44 times of WG 5.

With respect to Withanoside IV WG35 had higher Cmax than WG2.5 at least 2.8 fold higher. WG35 also reached Cmax almost an hour earlier compared to WG2.5. Elimination of Withanoside IV was much slower in WG35 group compared to other group, Withanoside IV got eliminated 3.7 times faster in WG2.5. The AUC of WG35 was 5.5 times than WG2.5. Withanoside IV was not detected in WG5 and WG 10.

Example 9

Effect of Withanolide Glycosides on the Expression of GABA and Histamine Receptors in Rat Glioblastoma (C6) Cell Line Effect of *Withania somnifera* extract on the expression of GABA and histamine receptors was studied in rat glioblastoma (C6) cell line. For this in vitro study the negative cell control (NC) was cell cultured with growth media and positive control (PC) was cell cultured with GABA (1 μg/mL). The study drug used for this experiment was *Withania somnifera* extract (WG35) with a HPLC profile as shown in FIG. 11 in a concentration of 15 μg/ml (SD1) and 30 μg/ml (SD2).

Cell culture treated with all test substances was subjected to cell lysis and total RNA was isolated from the sample, cDNAs were synthesised from the isolated total RNA. The synthesized cDNA was used for PCR amplification of GABA and Histamine receptor genes and GAPDH (internal control). For the amplification of GABA and Histamine receptor genes, 50p of the reaction mixture was subjected to PCR for amplification. The test cDNAs and the internal control GAPDH (Housekeeping gene) were co-amplified with each reaction using specifically designed primers.

The quantification of the gene expression of the GABA and histamine receptors was expressed as fold increase, such that the cell control (NC) had a value of 1.00. The positive control (PC) GABA (1 μg/mL) also had the value 1.00 while the *Withania somnifera* extract 15 μg/ml and 30 μg/ml (SD1 and SD2) had an increase of 1.45 and 2.1 folds respectively. The fold increase for histamine was 1.19 and 1.38 respectively. From the above results it is concluded that there was an increase in gene expression levels of GABA and histamine receptors after administering *Withania somnifera* extract at dosages of 15 & 30 μg/ml compared to control.

Example 10

Effect of *Withania somnifera* Extract on Pentobarbital Induced Sleep Activity

Swiss albino mice weighing 25-30 gm were used for the study. The animals were randomized into five groups consisting of six animals.

Group I animal was Control and treated with 0.5% carboxymethylcellulose (CMC),

Group II was positive control and treated with Diazepam (1 mg/kg w/w),

Group III was taken as treatment groups and fed with *Withania somnifera* extract (WG35) at the dose level of 5 mg/kg body weight, Group IV was taken as treatment groups and fed with *Withania somnifera* extract (WG35) at the dose level of 25 mg/kg body weight, and Group V was taken as treatment groups and fed with *Withania somnifera* extract (WG35) at the dose level of 50 mg/kg body weight.

Thirty minutes later, pentobarbital 40 mg/kg body weight was administered to each mouse to induce sleep. The onset time of sleep was recorded for all the animals. After induction of sleep, mice were placed in the inverted position and when sedation was over, the time point when the mice returned to their normal posture was noted. The time interval between dosing and the start of sleep was recorded as latency time.

TABLE 9

| Groups | Onset time of sleep (latency time) (min) | Percentage decrease in onset time of sleep | Duration of sleep | Percentage increase in duration of sleep |
|---|---|---|---|---|
| Group I | 51 | | 57 | |
| Group II | 27 | 47% | 99 | 74% |
| Group III (5 mg/kg) | 45 | 12% | 65 | 14% |
| Group IV (25 mg/kg) | 40 | 22% | 77 | 35% |
| Group V (50 mg/kg) | 33 | 35% | 89 | 56% |

From the table *Withania somnifera* extract at 50 mg/Kg showed 35% decrease in onset time of sleep and 56% increase in duration of sleep compared to negative control. *Withania somnifera* extract at 5 mg/Kg and 25 mg/kg dosage showed 12% and 22% decrease in onset time of sleep and 14% and 35% increase in duration of sleep compared to the control group. Minimum dosage calculated from 5 mg/kg dosage to mice is translated to 24 mg for 60 Kg human.

Example 11

Electrophysiological Changes in Wistar Rats by EEG.

Wistar rats with a body weight of 195-225 g of both sexes were selected for the study. Rats were randomly divided into 3 groups with four rats in each group. Electrode was placed inside the skull of each animal. After one week, animals were made to acclimatize to a wooden EEG recording chamber. The drug activity was recorded at the baseline with a vehicle and baseline signals were recorded for 10 minutes. At the end of the recordings, *Withania somnifera* extract (WG35) was administered at a dose of 10, 25 and 50 mg/Kg to group I, II, and III animals respectively. Recording of the EEG initiated after 45 min and EEG recorded for the next 15 minutes. The spectrogram of EEG signals was calculated.

Quantitative electroencephalograph data of rats before and after dosing with *Withania somnifera* extracts is shown in Table 10.

TABLE 10

| Mean power Mic V$^2$/Hz | | | |
|---|---|---|---|
| Test Groups | Baseline | Post treatment | Percentage change |
| Gamma | | | |
| 50 mg/kg | 4.63 | 5.37 | ↑16% |
| 25 mg/kg | 4.59 | 5.2 | ↑13% |
| 10 mg/kg | 4.5 | 5 | ↑11% |
| Delta | | | |
| 50 mg/kg | 1.6 | 2.24 | ↑40% |
| 25 mg/kg | 2.5 | 3.2 | ↑28% |
| 10 mg/kg | 2.2 | 2.66 | ↑21% |
| Theta | | | |
| 50 mg/kg | 6.85 | 7.33 | ↑7% |
| 25 mg/kg | 6.93 | 7.35 | ↑6% |
| 10 mg/kg | 7.5 | 7.87 | ↑5% |
| Beta | | | |
| 50 mg/kg | 3.55 | 4.26 | ↑20% |
| 25 mg/kg | 3.8 | 4.5 | ↑18% |
| 10 mg/kg | 4.1 | 4.6 | ↑12% |
| Alpha | | | |
| 50 mg/kg | 9.5 | 3.51 | ↓63% |
| 25 mg/kg | 9.1 | 3.64 | ↓60% |
| 10 mg/kg | 9.3 | 5.3 | ↓43% |

*Withania somnifera* extract showed changes in the electrophysiological properties of the rat brain with all three doses of the extract. At a dose of 10 mg and 25 mg/Kg, there was a significant increase of 21% and 28% in the activity of the delta band. *Withania somnifera* extract at a dose of 50 mg/kg showed 40% increase in the activity of the delta band. The theta band was 7% in high dose, 6% in mid, 5% in low dose; similarly, gamma band activity was increased by 11% in low dose, 13% in mid, and 16% in high dose. The beta band was significantly increased by 12% in the low dose group and increased by 18% & 20% for the mid and high dose group. The alpha band activity diminished physiologically in the low, mid and high dose ranges (143%, 160% and 163%).

Example 12

Anti-Immobility Activity of Different *Withania somnifera* Extracts in Reserpinized Rats For the study rats were divided into seven groups having 4 rats in each group. The test was conducted as per the protocol disclosed in U.S. Pat. No. 9,987,323B2. Doses in each group were calculated thus that only 5 mg/Kg body weight withanolide were administered to each animal.
Group I: Normal control (Received only vehicle; 1% Tween 80 v/v p.o.).
Group II: Reserpine (6 mg/kg i.p)+Vehicle (1% Tween 80 v/v p.o.).
Group III: Reserpine (6 mg/kg i.p)+Powdered *Withania somnifera* plant parts—Dosage 1750 mg/kg p.o.
Group IV: Reserpine (6 mg/kg i.p)+*Withania somnifera* plant extract 2.5% withanolides (WG2.5) standardized—Dosage 200 mg/kg p.o.
Group V: Reserpine (6 mg/kg i.p)+*Withania somnifera* plant extract 5% withanolides (WG5) standardized—Dosage 100 mg/kg p.o.
Group VI: Reserpine (6 mg/kg i.p)+*Withania somnifera* plant extract 10% withanolide glycoside (WG10) standardized—Dosage 50 mg/kg p.o.
Group VII: Reserpine (6 mg/kg i.p)+*Withania* leaves and root extract WG35—Dosage 14 mg/kg p.o.

Effect of different *Withania somnifera* extracts on Immobility time in rats is shown in table 11.

TABLE 11

| Groups | Treatment | Time (seconds) |
|---|---|---|
| Group I | Normal control (Received only vehicle; 1% Tween 80 v/v p.o.). | 119 |
| Group II | Reserpine (6 mg/kg i.p) + Vehicle (1% Tween 80 v/v p.o.). | 210 |
| Group III | Reserpine (6 mg/kg i.p) + Powdered *Withania somnifera* plant parts | 206 |
| Group IV | Reserpine (6 mg/kg i.p) + WG2.5 | 205 |
| Group V | Reserpine (6 mg/kg i.p) + WG5 | 204 |
| Group VI | Reserpine (6 mg/kg i.p) + WG10 | 203 |
| Group VII | Reserpine (6 mg/kg i.p) + WG35 | 132 |

The immobility time for Group I animals, the control group, was around 119 seconds. After the reserpine administration in Group II animals the mean immobility time was increased to 210 seconds. No significant improvement was seen in immobility time for animals from Group III, group IV, group V and group VI, that were, animals treated with *Withania somnifera* plant powder 0.4% withanolides, WG2.5, WG5, and WG10. Group VII showed significant improvement in immobility time, about 85% normalcy in immobility time was achieved.

Example 13

Efficacy Studies of *Withania somnifera* Extracts

1. Antistress Activity:
a. Anoxia Stress Tolerance (AST) Test:

Albino Wistar rats of either sex weighing 150-220 g were selected and divided into seven groups of six each. Doses in each group were calculated thus, only 5 mg/Kg body weight withanolide were administered to each animal. The test was conducted as per the protocol disclosed in U.S. Pat. No. 9,987,323B2. Doses in each group were calculated thus that only 5 mg/Kg body weight withanolide were administered to each animal Group I: Normal control (Received only vehicle; 1% Tween 80 v/v p.o.).
Group II: Powdered *Withania somnifera* plant parts—Dosage 1750 mg/kg p.o.
Group III: *Withania somnifera* plant extract 2.5% withanolides (WG2.5) standardized—Dosage 200 mg/kg p.o.
Group IV: *Withania somnifera* plant extract 5% withanolides (WG5) standardized—Dosage 100 mg/kg p.o.
Group V: *Withania somnifera* plant extract 10% withanolide glycoside (WG10) standardized—Dosage 50 mg/kg p.o.
Group VI: *Withania* leaves and root extract (WG35)—withanolides glycosides as per example 4, Dosage 14 mg/kg p.o.
Group VII Diazepam (2 mg/kg p.o.).

Animals were treated as shown above for the 3 weeks. At the end of 1st, 2nd and 3rd week i.e., on 7th, 14th and 21st day 1 h after the treatment stress was induced by placing each animal individually in the hermetic vessel of 1 L capacity to record anoxia tolerance time. The time duration of entry of the animal into the hermetic vessel and the appearance of the first convulsion was taken as time of anoxia.

Effect of *Withania somnifera* extracts on anoxia stress tolerance (AST) time in rats is shown in Table 12.

TABLE 12

| Groups | Treatment | Duration of anoxia stress tolerance in minutes | | |
|---|---|---|---|---|
| | | $1^{st}$ week | $2^{nd}$ week | $3^{rd}$ week |
| Group I | Normal control | 18.50 | 18.75 | 19.25 |
| Group II | Powdered *Withania somnifera* plant parts. | 21.33 | 27.67 | 29.00 |
| Group III | WG2.5 | 23.67 | 29.33 | 30.10 |
| Group IV | WG5 | 23.83 | 28.67 | 30.78 |
| Group V | WG10 | 23.67 | 29.67 | 30.33 |
| Group VI | WG35 | 32.33 | 38.66 | 48.51 |
| Group VII | Diazepam (2 mg/kg p.o.). | 34.40 | 35.1 | 37.00 |

The results obtained from the anoxia stress tolerance test were expressed as an average of six rats. There was some increased in AST time during the test period for Group II, Group III, Group IV, and Group V treated with *Withania somnifera* hydroalcoholic extract standardized with 2.5%, 5% and 10% withanolides, though the time was not statistically significant. However, a significant increase in AST time was observed in group VI, an increase of about 75% on the $1^{st}$ week, over 100% on the second week and over 150% by the $3^{rd}$ week.

b. Swimming Endurance Test:

Swiss mice of either sex weighing 20-25 g were selected and divided into seven groups of six each and following treatment was given after one week of acclimatization:

Group I Normal control (Received only vehicle; 1% Tween 80 v/v p.o.).
Group II Powdered *Withania somnifera* plant parts—Dosage 1750 mg/kg p.o.
Group III *Withania somnifera* plant extract 2.5% withanolides (WG2.5) Dosage 200 mg/kg p.o.
Group IV *Withania somnifera* plant extract 5% withanolides (WG5) Dosage 100 mg/kg p.o.
Group V *Withania somnifera* plant extract 10% withanolide glycoside (WG10) Dosage 50 mg/kg p.o.
Group VI *Withania somnifera* root and leaves extract with 35±3% (WG35) withanolides glycosides as per example 4 Dosage 14 mg/kg p.o.
Group VII Diazepam (2 mg/kg p.o.).

Extracts were given to the mice, once daily for a period of 7 days. On 8th day the mice were subjected to swimming stress by keeping them in propylene tank of dimension (37×37×30 cm), filled with water to a height of 25 cm. The rats were allowed to swim till complete exhaustion and the endpoint was taken when the animal started drowning. The mean swimming time for each group was calculated. Effect of *Withania somnifera* extracts on swimming endurance in mice is provided in table 13.

TABLE 13

| Groups | Treatment | Swimming time in minutes |
|---|---|---|
| Group I | Normal control (Received only vehicle | 32.50 |
| Group II | Powdered *Withania somnifera* plant parts | 39.50 |
| Group III | WG2.5 | 39.67 |
| Group IV | WG5 | 40.33 |
| Group V | WG10 | 39.75 |
| Group VI | WG35 | 55.50 |
| Group VII | Diazepam (2 mg/kg p.o.). | 58.67 |

There was an improvement in the swimming time of about 20% in Group 11, Group 111, Group IV, and group V, but the results were not as significant as that of group VI. The average swimming endurance time was significantly increased on the 8th day in Group VI (over 70% increase) and it was at par with Diazepam (2 mg/kg) treated group.

2. Immunomodulatory Activity a. Effect of *Withania somnifera* extracts on the bone marrow cellularity and α-esterase positive cells.

Balb/c mice (20-25 gm) were divided into seven groups with 6 mice in each group. The following treatment was given for 7 days:

Table 5: Segregation of Mice for Experimental Study.
  Group I: Normal control (Received only vehicle; 1% Tween 80 v/v p.o.).
  Group III: Powdered *Withania somnifera* plant parts— Dosage 1750 mg/kg p.o.
  Group III *Withania somnifera* plant extract 2.5% withanolides (WG2.5) Dosage 200 mg/kg p.o.
  Group IV *Withania somnifera* plant extract 5% withanolides (WG 5) Dosage 100 mg/kg p.o.
  Group V *Withania somnifera* plant extract 10% withanolide glycoside (WG10) Dosage 50 mg/kg p.o.
  Group VI *Withania somnifera* root and leaves extract with 35±3% (WG35) withanolide glycosides as per example 4 Dosage 14 mg/kg p.o.

Animals were sacrificed after the last dose of drug treatment and bone marrow was collected from femur into medium containing 2% Fetal Calf Serum. The number of bone marrow cells was determined using a haemocytometer and expressed as total live cells/femur. A smear of the bone marrow cells from the above preparation was made on clean glass slides and stained with Para-rosaniline hydrochloride and counter stained with hematoxylin to determine the non-specific α-esterase positive cells. Effect of *Withania somnifera* extracts on bone marrow cellularity and α-esterase activity are provided in Table 14.

TABLE 14

| Groups | Treatment | Bone marrow cellularity (cells/femur) | α-esterase activity (No. of α-esterase positive cells) |
| --- | --- | --- | --- |
| Group I | Normal control (Received only vehicle; 1% Tween 80 v/v p.o.). | $14 \times 10^6$ | 1030 |
| Group II | Powdered *Withania somnifera* plant parts. | $20 \times 10^6$ | 1350 |
| Group III | WG 2.5 | $20 \times 10^6$ | 1400 |
| Group IV | WG 5 | $21 \times 10^6$ | 1440 |
| Group V | WG10 | $21 \times 10^6$ | 1440 |
| Group VI | WG 35 | $32 \times 10^6$ | 2400 |

On average Group II, Group III, Group IV, and group V, showed an increase in the bone marrow cells compared to control group, around 19 to 21% increase, but it was less when compared to Group VI. The Group VI showed a significant increase in the bone marrow cells compared to control group, an increase of about 130%. Furthermore, the number of α-esterase positive cells were also found to be increased significantly in Group VI, an increase of 133%. Group II Group III, Group IV, and group V this increase was around 31 to 40%.

b. Effect of *Withania somnifera* Extracts on Circulating Antibody Titre.

Balb/c mice were immunized with SRBC (0.1 ml, i.p.) and divided into eight groups with 4 rats each and treated as follows for 10 days. Segregation of mice for experimental study:

Group I: Normal control (Received only vehicle; 1% Tween 80 v/v p.o.).
  Group II: Powdered *Withania somnifera* plant parts— Dosage 1750 mg/kg p.o.
  Group III *Withania somnifera* plant extract 2.5% withanolides (WG2.5) Dosage 200 mg/kg p.o.
  Group IV *Withania somnifera* plant extract 5% withanolides (WG 5) Dosage 100 mg/kg p.o.
  Group V *Withania somnifera* plant extract 10% withanolide glycoside (WG10) Dosage 50 mg/kg p.o.
  Group VI *Withania somnifera* root and leaves extract with 35±3% (WG35) withanolide glycosides as per example 4 Dosage 14 mg/kg p.o.

Blood was collected from the caudal vein prior to the treatment and after the last dose were administered. Serum was separated and heat inactivated at 56° C. for 30 min. Antibody titre was estimated using SRBC as the antigen. For this, serum was serially diluted with PBS in 96 well round bottom titre plates. Equal volumes of 1% trypsnised SRBC (Ag) were added, mixed gently and incubated at room temperature for 3 h, and the agglutination titers were recorded. Effect of *Withania somnifera* extracts on circulating antibody titre is provided in table 14.

TABLE 14

| | | Antibody titre | |
| --- | --- | --- | --- |
| Groups | Treatment | Initial | Final |
| Group I | Normal control (1% Tween 80 v/v p.o.). | 22 | 45 |
| Group II | Powdered *Withania somnifera* plant parts. | 23 | 246 |
| Group III | WG2.5 | 24 | 244 |
| Group IV | WG5 | 25 | 248 |
| Group V | WG10 | 26 | 251 |
| Group VI | WG35 | 23 | 680 |

Maximum titre value from control animals was found to be 45 only, compared to that maximum antibody titre value of 680 was observed in group VT. All other groups also increased the titre value, but these were below 300 marks.

c. Effect of *Withania somnifera* extracts on the antibody producing cells.

The number of plaques forming cells from the spleen was determined by Plaque assay. Balb/c mice were divided into six groups with 4 mice each, and treated as follows for 7 days:

Segregation of Mice for Experimental Study:
  Group I: Normal control (Received only vehicle; 1% Tween 80 v/v p.o.).
  Group II: Powdered *Withania somnifera* plant parts— Dosage 1750 mg/kg p.o.
  Group III:*Withania somnifera* plant extract 2.5% withanolides (WG2.5) Dosage 200 mg/kg p.o.
  Group IV:*Withania somnifera* plant extract 5% withanolides (WG 5) Dosage 100 mg/kg p.o.
  Group V:*Withania somnifera* plant extract 10% withanolide glycoside (WG10) Dosage 50 mg/kg p.o.
  Group VI:*Withania somnifera* root and leaves extract with 35±3% (WG35) withanolide glycosides as per example 4 Dosage 14 mg/kg p.o.

On $7^{th}$ day the mice were immunized with SRBC ($2.5 \times 10^8$). The animals were sacrificed after 4 days; spleens were processed into a single cell suspension and the cell number was adjusted to $8 \times 10^6$ cells/ml. Fifty microlitres of spleen cell suspension and 50 ml of Ag (SRBC 7%) were mixed with 0.5 ml of 0.5% molten agarose kept at 45° C. and spread on slides. After solidifying the agarose, the gels were incubated in the presence of compliment (rabbit serum at 37° C. for I h). Number of plaques was counted using a colony counter. Effect of *Withania somnifera* extracts on antibody producing cells is provided in the table 15.

TABLE 15

| Groups | Treatment | No. of PFC/$10^6$ spleen cells |
|---|---|---|
| Group I | Normal control (Received only vehicle; 1% Tween 80 v/v p.o.). | 300 |
| Group II | Powdered *Withania somnifera* plant parts. | 540 |
| Group III | WG2.5 | 545 |
| Group IV | WG5 | 550 |
| Group V | WG10 | 560 |
| Group VI | WG35 | 950 |

*Withania somnifera* extract administration was found to significantly enhance the number of antibodies producing cells in spleen. The maximum number of plaques forming cells (PFC) was found in Group VI. All other extracts also increased the number of plaques forming cells but these below the 600 marks.

3. Anti-Inflammatory Activity.

Anti-inflammatory activity of *Withania somnifera* extracts was assessed by carrageenan induced paw edema model in rats. Wistar rats were divided into seven groups (n=5). Following treatment was given to the rats as single dose;

Group 1: Control (Received only vehicle, 1% Tween 80 v/v p.o.)

Group II: Powdered *Withania somnifera* plant parts minimum 0.4% withanolides—Dosage 1750 mg/kg p.o.

Group III: *Withania somnifera* plant extract standardized minimum 2.5% withanolides (WG2.5)—Dosage 200 mg/kg p.o.

Group IV: *Withania somnifera* plant extract standardized minimum 5% withanolides (WG5)—Dosage 100 mg/kg p.o.

Group V: *Withania somnifera* plant extract standardized minimum 10% Withanolide Glycoside (WG10)—Dosage 50 mg/kg p.o.

Group VI: Sample 2 standardized with minimum 35±3% Withanolide Glycoside (WG 35)—Dosage 14 mg/kg p.o).

Group VII: Indomethacin (10 mg/kg p.o.).

After 30 minutes of extracts 0.1 mL of carrageenan (1% in normal saline) was injected into the right hind paw of each rat. The paw volume was measured plethysmographically at 0, 0.5, 1, 2, 3, 4 and $5^{th}$ hour after challenge. The percentage inhibition of edema was calculated for each group with respect to the vehicle received control group of animals. Percentage inhibition of inflammation in carrageenan induced paw oedema model is provided in Table 16.

TABLE 16

| | | Percentage inhibition (%) | | | |
|---|---|---|---|---|---|
| Groups | Treatment | 0.5 hr | 1 hr | 2 hr | 3 hr |
| Group I | Control (Received only vehicle; 1% Tween 80 v/v p.o.) | 0 | 0 | 0 | 0 |
| Group II | Powdered *Withania somnifera* plant parts. | 7 | 15 | 21 | 26 |
| Group III | WG2.5 | 6 | 19 | 26 | 28 |
| Group IV | WG5 | 9 | 17 | 23 | 29 |
| Group V | WG10 | 8 | 18 | 24 | 30 |

TABLE 16-continued

| | | Percentage inhibition (%) | | | |
|---|---|---|---|---|---|
| Groups | Treatment | 0.5 hr | 1 hr | 2 hr | 3 hr |
| Group VI | WG35 | 12 | 24 | 40 | 58 |
| Group VII | Indomethacin (10 mg/kg p.o.). | 28 | 65 | 80 | 86 |

The maximum percentage inhibition was shown at 3 hours after carrageenan injection. Maximum percentage inhibition of inflammation was observed in animals fed with indomethacin. Among the treated groups, group VI was found to be most effective in reducing the inflammation in rat paw by 58% with in 3 hours. *Withania somnifera* extract with 2.5%, 5% and 10% withanolide glycoside was also found to be effective in reducing the inflammation in rat paw but did not cross 30% inhibition.

Example 14

Effect of *Withania somnifera* Extract on Anxiety

A 60 days double-blinded randomized placebo controlled trial to evaluate the effect of the *Withania somnifera* extract on generalized anxiety disorder by analyzing the serum cortisol and Hamilton Anxiety Rating Scale (HAM-A) questionnaire.

60 subjects (both males and females) were selected and randomly and equally allocated into three groups, 60 mg and 120 mg *Withania somnifera* extract (WG 35) was administered/day for 60 days.

Parameters analyzed were HAM-A, cortisol and testosterone. Each parameter was analyzed every 15 days by collecting blood samples. Assessment of testosterone levels was only undertaken at baseline day 30 and day 60.

Group 1 was administered microcrystalline cellulose (MCC) (120 mg/day),

Group 2 was administered *Withania somnifera* extract (WG35) (60 mg/day)

Group 3 was administered *Withania somnifera* extract (WG35) (120 mg/day)

TABLE 1

Levels of Cortisol (µg/dL) in males after administering test products

| | Baseline | Day 15 | Day 30 | Day 45 | Day 60 |
|---|---|---|---|---|---|
| Placebo | 26 | 25 | 25 | 25 | 24 |
| WG 35 (60 mg/day) | 26 | 21 | 14 | 10 | 9 |
| WG 35 (120 mg/day) | 26 | 21 | 13 | 10 | 8 |

TABLE 2

Levels of Cortisol (µg/dL) in females after administering test products

| | Baseline | Day 15 | Day 30 | Day 45 | Day 60 |
|---|---|---|---|---|---|
| Placebo | 26 | 26 | 25 | 26 | 25 |
| WG 35 (60 mg/day) | 27 | 22 | 15 | 11 | 9 |
| WG 35 (120 mg/day) | 26 | 20 | 11 | 8 | 7 |

After administering 60 mg and 120 mg WG 35 per day there was a 66% and 69% reduction in cortisol in males was observed over time which was statistically significant. In females after administering 60 mg and 120 mg WG 35 per day, a statistically significant 66% and 73% reduction in cortisol was observed.

TABLE 3

Levels of testosterone(ng/ml) in males after administering test products

| | Baseline | Day 30 | Day 60 |
|---|---|---|---|
| Placebo | 3.08 | 3.26 | 3.21 |
| WG 35 (60 mg/day) | 3.50 | 3.79 | 4.26 |
| WG 35 (120 mg/day) | 3.35 | 4.00 | 4.39 |

There was a 22% and 31% increase in testosterone levels in males were observed from baseline to day 60 after administering 60 mg and 120 mg WG 35 per day which was statistically significant.

TABLE 4

HAM-A rating score after administering test products

| | Baseline | Day 15 | Day 30 | Day 45 | Day 60 |
|---|---|---|---|---|---|
| Placebo | 24 | 24 | 24 | 24 | 24 |
| WG 35 (60 mg/day) | 24 | 20 | 16 | 15 | 10 |
| WG 35 (120 mg/day) | 24 | 18 | 13 | 10 | 8 |

There was a 59% reduction in HAM-A score after administering 60 mg WG 35 per day. In group administered with 120 mg WG 35 showed statistically significant 66% reduction in HAM-A.

The present disclosure provides a composition and a process to manufacture the composition of *Withania somnifera* extract characterised by about 32% to about 38% w/w Withanolide glycosides.

The above specification is illustrative and not restrictive. Many variations of the disclosed composition and process will be become apparent for a person skilled in the art upon review of the specification.

What is claimed is:

1. A unit dosage of an oral composition of an extract of *Withania somnifera*, wherein the extract of *Withania somnifera* comprises total withanolides, wherein the total withanolides comprise withanoilide glycosides and withanolide aglycones, wherein the extract of *Withania somnifera* comprises about 32% to about 38% by weight of the withanolide glycosides, wherein the withanolide glycosides comprise withanoside IV, and the withanolide aglycones comprise withanolide A and withaferin A, wherein the extract of *Withania somnifera* comprises a ratio of withanoside IV: withaferin A is in a range of about 1:3 w/w to about 3:1 w/w, wherein a dosage form comprising the unit dosage of the oral composition of the extract of *Withania somnifera* is selected from a group comprising capsule, tablet powder, granule, soft gel capsule, suspension, dispersion, elixir, paste, gel, liquid, dragees, and combinations thereof, and wherein a dosage of the extract of *Withania somnifera* in the unit dosage of the oral composition of the extract of *Withania somnifera* ranges from about 1 mg to about 1000 mg of the extract of *Withania somnifera*.

2. The unit dosage of the oral composition of the extract of *Withania somnifera* of claim 1 further comprising an additive, wherein the additive is selected from the group consisting of a nutrient, magnesium stearate, stearic acid, rice flour, cellulose, silicon dioxide, sugar, hydroxypropyl methylcellulose, glycerine, gelatine, propylene glycol, polyethylene glycol, pectin, sodium citrate, beeswax, purified water, vegetable oil, injectable organic esters and combinations thereof.

3. The unit dosage of the oral composition of the extract of *Withania somnifera* of claim 1, wherein the extract of *Withania somnifera* comprises about 35% by weight of the withanolide glycosides.

4. The unit dosage of the oral composition of the extract of *Withania somnifera* of claim 1, wherein the extract of *Withania somnifera* comprises at least about 2% withanoside IV by weight and about 2% withaferin A by weight.

5. The unit dosage of the oral composition of the extract of *Withania somnifera* of claim 1, wherein the extract of *Withania somnifera* is prepared from the root and leaf of *Withania somnifera* plant.

6. The unit dosage of the oral composition of the extract of *Withania somnifera* of claim 2, wherein the nutrient is selected from a group consisting of amino acids, carbohydrates, vitamins, folic acid, omega-3 fatty acids, minerals, herbal extracts, lutein, zeaxanthin, antioxidants and combination thereof.

7. The unit dosage of the oral composition of the extract of *Withania somnifera* of claim 1 comprising a dosage ranging from about 24 mg to about 480 mg of the extract of *Withania somnifera*.

8. The unit dosage of the oral composition of claim 1, wherein an effective dose ranges from about 0.4 mg to about 8 mg of the extract of *Withania somnifera* per kg body weight of a mammal.

* * * * *